United States Patent
Madriz Ottolina et al.

(10) Patent No.: US 10,721,511 B2
(45) Date of Patent: Jul. 21, 2020

(54) SYSTEMS AND METHODS FOR COORDINATING ONLINE ACTIVITY WITH BROADCAST TELEVISION

(71) Applicant: TMT Lab Inc., Toronto (CA)

(72) Inventors: Rodrigo Dario Madriz Ottolina, Toronto (CA); Uditha Priyankara Subasinghe, Oakville (CA)

(73) Assignee: TMT Lab Inc., Toronto, Ontario (CA)

( * ) Notice: Subject to any disclaimer, the term of this patent is extended or adjusted under 35 U.S.C. 154(b) by 0 days.

(21) Appl. No.: 15/776,970

(22) PCT Filed: Nov. 18, 2016

(86) PCT No.: PCT/CA2016/000286
§ 371 (c)(1),
(2) Date: May 17, 2018

(87) PCT Pub. No.: WO2017/083957
PCT Pub. Date: May 26, 2017

(65) Prior Publication Data
US 2018/0338169 A1    Nov. 22, 2018

Related U.S. Application Data

(60) Provisional application No. 62/258,255, filed on Nov. 20, 2015.

(51) Int. Cl.
*H04N 21/262* (2011.01)
*H04N 21/81* (2011.01)
(Continued)

(52) U.S. Cl.
CPC ........... *H04N 21/262* (2013.01); *G06Q 30/02* (2013.01); *G06Q 30/0241* (2013.01);
(Continued)

(58) Field of Classification Search
None
See application file for complete search history.

(56) References Cited

U.S. PATENT DOCUMENTS

2008/0092168 A1* 4/2008 Logan ................. G10H 1/0033
725/44
2009/0210899 A1* 8/2009 Lawrence-Apfelbaum .................
H04L 12/2801
725/34
(Continued)

*Primary Examiner* — Michael R Telan
(74) *Attorney, Agent, or Firm* — The Webb Law Firm

(57) ABSTRACT

Systems and method for coordinating online activity with broadcast television are disclosed. In some embodiments, the system includes a coordination server configured to read a coordination index that includes: an identifier for online content stored on an online content server, where the online content is transmittable to a computing device for output on the computing device; and scheduling information of a broadcast event to be broadcasted on broadcast television. The coordination index associates the scheduling information of the broadcast event with the identifier for the online content. Based on the coordination index, the coordination server generates a signal to indicate a broadcast status of the broadcast event. Upon the signal being read by the online content server, the online content server transmits the online content to the computing device in accordance with one or more rules for interpreting the signal.

41 Claims, 18 Drawing Sheets

(51) Int. Cl.
  *H04N 21/4722* (2011.01)
  *H04H 60/06* (2008.01)
  *H04H 20/18* (2008.01)
  *H04N 21/462* (2011.01)
  *H04N 21/478* (2011.01)
  *G06Q 30/02* (2012.01)
  *H04N 21/647* (2011.01)
  *H04N 21/43* (2011.01)
  *G06Q 50/00* (2012.01)
  *H04N 21/435* (2011.01)
  *H04N 21/44* (2011.01)
  *H04N 21/84* (2011.01)

(52) U.S. Cl.
  CPC ......... *G06Q 30/0277* (2013.01); *G06Q 50/01* (2013.01); *H04H 20/18* (2013.01); *H04H 60/06* (2013.01); *H04N 21/435* (2013.01); *H04N 21/4307* (2013.01); *H04N 21/44016* (2013.01); *H04N 21/4622* (2013.01); *H04N 21/478* (2013.01); *H04N 21/4722* (2013.01); *H04N 21/647* (2013.01); *H04N 21/812* (2013.01); *H04N 21/84* (2013.01)

(56) References Cited

U.S. PATENT DOCUMENTS

| | | |
|---|---|---|
| 2013/0006980 A1 | 1/2013 | Frumin |
| 2013/0014158 A1* | 1/2013 | Bhatia ................ H04N 21/252 725/34 |
| 2013/0070152 A1* | 3/2013 | Berkowitz ........... H04N 21/235 348/500 |
| 2013/0268962 A1 | 10/2013 | Snider et al. |
| 2014/0282772 A1* | 9/2014 | Chen ................ H04N 21/26258 725/97 |
| 2014/0351866 A1 | 11/2014 | Wang |
| 2015/0121432 A1* | 4/2015 | Pandey ........... H04N 21/25891 725/78 |

* cited by examiner

| Localization Parameters | Online Ad Networks | CampaignID | Ad Service Log In | Ad Service PW | Content ID |
|---|---|---|---|---|---|
| only in Canada | Google DoubleClick™ | PacAirOct2015 | AdProDCUserName | ****** | 987654 |
| only in the U.S. | Google DoubleClick™ | PacAirOct2015 | AdProDCUserName | ****** | 135315 |
| only for Chicago, NYC, and LA | Instagram™ | PRCoAMotorsOct2015 | PRColgramUserName | ****** | 75237 |
| only for Palm Springs and Ft. Lauderdale | AOL™ | PRCoAMotorsOct2015 | PRCoAOLUserName | ****** | 85333 |
| none | Google DoubleClick™ | BurnettCBankOct2015 | BurnettDCUserName | ****** | 24864 |
| none | Twitter™ | BurnettCBankOct2015 | BurnettTWTRUserName | ****** | 44685 |

FIG. 3B

Online Advertisement Control Center — 603

Ad Agency [Logout] — 670

| Campaign Dashboard | Create Campaigns | Ad Placement | Manage Advertisers |

Campaign Dashboard - Campaign View
Campaign Dashboard - Advertisement View
Advertisers
Campaigns

[Create Campaign] — 675

| Name | Status | Advertiser | Group | Start Date | End Date |
|---|---|---|---|---|---|
| PacAirAug2015 | Archived | Pacific Air | >$50K Spend | Aug 1, 2015 | Aug 31, 2015 |
| PacAirSept2015 | Archived | Pacific Air | >$50K Spend | Sept 1, 2015 | Sept 30, 2015 |
| PacAirOct2015 | Active | Pacific Air | >$50K Spend | Oct 1, 2015 | Oct 31, 2015 |
| PacAirDec2015 | Pending | Pacific Air | >$50K Spend | Dec 1, 2015 | Dec 31, 2015 |

[▼][▲][▲] 1 2 [▼][▲][▼]          1 - 4 of 6 items

SYSTEMS AND METHODS FOR COORDINATING ONLINE ACTIVITY WITH BROADCAST TELEVISION

CROSS-REFERENCE TO RELATED APPLICATIONS

This application is the United States national phase of International Application No. PCT/CA2016/000286 filed Nov. 18, 2016, and claims priority to U.S. Provisional Patent Application No. 62/258,255 filed Nov. 20, 2015, the disclosures of which are hereby incorporated in their entirety by reference.

FIELD OF THE DISCLOSURE

The present disclosure relates generally to systems and methods for coordinating activity amongst multiple devices, and in particular, to systems and methods for coordination of online activity with broadcast television.

BACKGROUND

Broadcast television typically carries broadcast events (e.g., a show, sporting event, or an advertisement) that occur at scheduled times. For example, during commercial breaks, broadcast television advertisements (also referred to as a television spot) are typically arranged to be shown in sequence prior to the resumption of the show or the beginning of another show.

Producers of content for such broadcast events (e.g., an ad agency creating a campaign to market a product or service) may often create corresponding content that is to be outputted on additional media platforms other than broadcast television. For example, in conjunction with the television spots, the ad agency may conduct a corresponding online advertising campaign to market the same product or service on popular webpages or social media platforms (e.g., Facebook™ or Twitter™ websites or their corresponding apps on a variety of different operating systems such as Apple™ iOS™ or Android™).

Traditionally, the timing of when the broadcast event airs and when the online content is outputted at a computing device is not coordinated. For example, the broadcast event may air at a certain time on a given day, but the online content may not be outputted for viewing at a computing device until a different time on that day. At that later point in time, the audience who viewed the broadcast event may no longer remember viewing it. This may cause the online activity to be less effective.

There is thus a need for improved systems and methods for coordinating online activity with broadcast television.

BRIEF DESCRIPTION OF THE DRAWINGS

Non-limiting examples of various embodiments of the present disclosure will next be described in relation to the drawings, in which:

FIGS. 3A-3C is a table illustrating the reading of an example coordination index and the generation of signals indicating broadcast statuses of broadcast events, in accordance with at least one embodiment of the present invention;

FIGS. 6A-6D are example user interfaces of an 'ad agency' view that may be presented by a coordination server, in accordance with at least one embodiment of the present invention;

DETAILED DESCRIPTION

Figure 1:
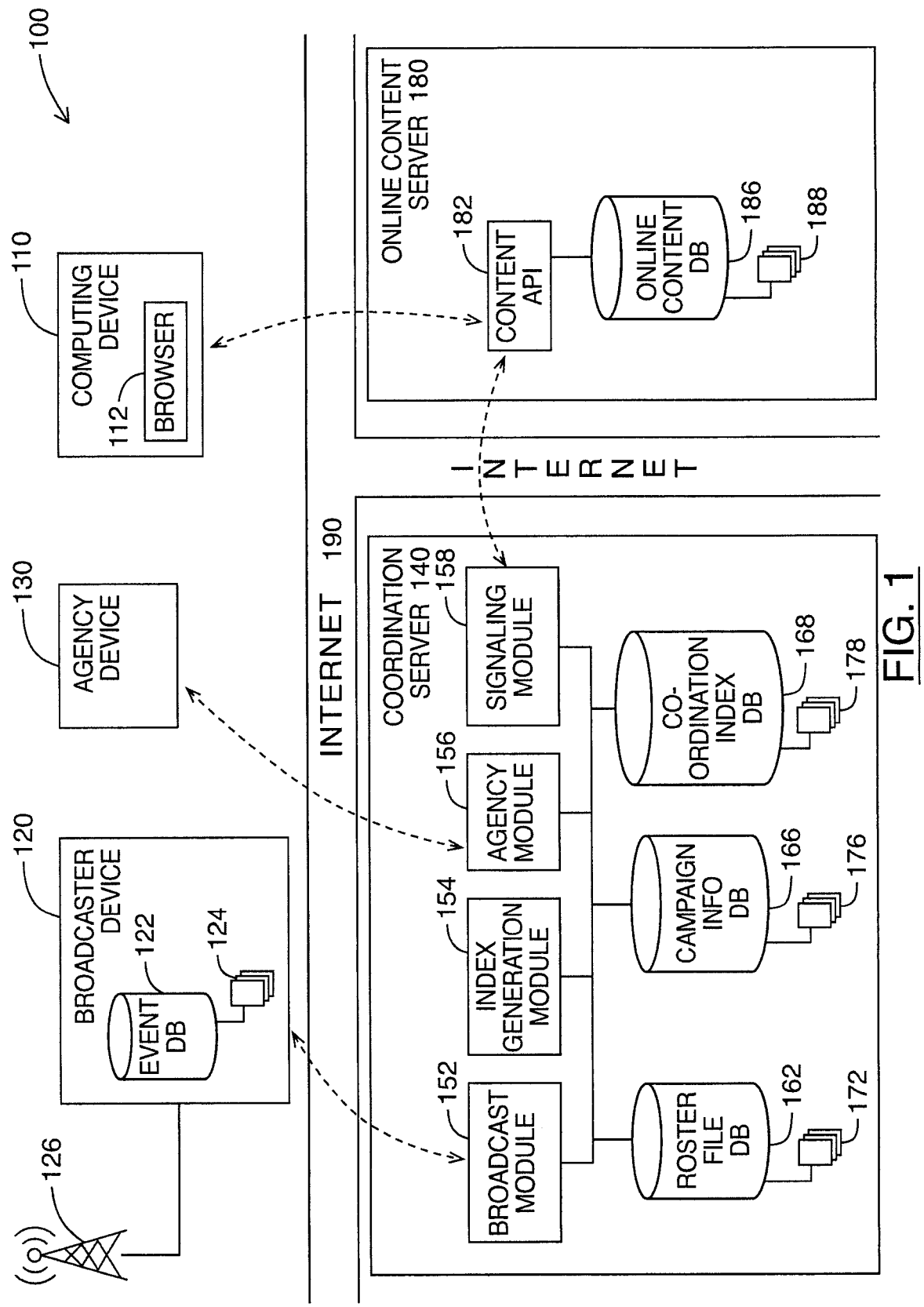
FIG. 1 is a block diagram of a system for coordinating online activity with broadcast television, in accordance with at least one embodiment of the present invention.

In a first broad aspect of the present disclosure, there is provided a method of coordinating online activity with broadcast television, the method including: reading a coordination index that has an identifier for online content stored on a server, the online content being transmittable to a computing device for output on the computing device, and scheduling information of a broadcast event to be broadcasted on broadcast television, wherein the coordination index associates the scheduling information of the broadcast event with the identifier for the online content; based on the coordination index, generating a signal to indicate a broadcast status of the broadcast event; wherein, upon the signal being read by the server, the server transmits the online content to the computing device in accordance with one or more rules for interpreting the signal.

In some embodiments, the scheduling information includes a scheduled begin time for when the broadcast event is to be broadcasted on broadcast television. In some embodiments, prior to the scheduled begin time, the signal indicates that the broadcast event is about to be broadcasted. In some embodiments, at the scheduled begin time, the signal indicates that the broadcast event is being broadcasted live.

In some embodiments, the scheduling information includes a scheduled end time for when the broadcast event is to cease being broadcasted on broadcast television, and at the scheduled end time, the signal ceases to indicate that the broadcast event is being broadcasted live. In some embodiments, after the scheduled end time, the signal indicates that the broadcast event has recently been broadcasted.

In some embodiments, the coordination index includes additional scheduling information of additional broadcast events to be broadcasted on broadcast television, and wherein the scheduling information and the additional scheduling information includes sequence information for an airing order of the broadcast event and the additional broadcast events, without including schedule begin times for the broadcast event and the additional broadcast events.

In some embodiments, the coordination index includes additional scheduling information of additional broadcast events to be broadcasted on broadcast television, and the server stores additional online content, and the method further includes: based on the coordination index, generating additional signals to indicate respective broadcast statuses of the additional broadcast events; wherein, upon the additional signals being read by the server, the server transmits the additional online content to the computing device in accordance with the one or more rules. In some embodiments, the additional scheduling information for one of the additional broadcast events indicates that one of the additional broadcast events is to be broadcasted on broadcast television during a time period immediately before the broadcast event, and during the time period, the signal for the broadcast event indicates that the broadcast event is to be broadcasted next.

In some embodiments, the method further includes: receiving an input that indicates whether the broadcast event is being broadcasted live on broadcast television; and inserting the information from the input into the signal.

In some embodiments, the one or more rules provide that when the signal indicates the broadcast event is being broadcasted live, the server is configured to transmit the online content to the computing device so that the online content can be displayed synchronously.

In some embodiments, the one or more rules provide that when the signal indicates that the broadcast event has recently been broadcasted, the server is configured to transmit the online content to the computing device so that the online content can be outputted within an amount of time after the broadcast event was broadcasted live. In some embodiments, the one or more rules provide that when the signal indicates that the broadcast event is about to be broadcasted, the server is configured to transmit the online content to the computing device so that the online content can be outputted within an amount of time before the broadcast event is broadcasted live. In some embodiments, the amount of time in these scenarios can be selected from the group consisting of: 15 seconds, 30 seconds, 1 minute, 2 minutes, 5 minutes, 10 minutes, 15 minutes, 30 minutes, and 1 hour.

In some embodiments, the signal includes a timestamp for when the signal began to indicate that the broadcast event is being broadcasted live.

In some embodiments, the broadcast event includes a television advertisement. In some embodiments, the online content includes an online advertisement to be displayed within a browser application executing on the computing device. In some embodiments, the server includes an online advertisement service server configured to read the signal as an input for triggering when the online advertisement is to be served for display within the browser application.

In some embodiments, prior to the reading of the coordination index, the method further includes generating the coordination index by: loading campaign information including the identifier for the online content and a first campaign identifier associated with the online content; loading a roster file including the scheduling information of the broadcast event and a second campaign identifier associated with the broadcast event; and merging the roster file with the campaign information by associating the scheduling information of the broadcast event with the identifier for the online content when the first campaign identifier matches the second campaign identifier.

In some embodiments, the generated signal includes the identifier for the online content, and the identifier is used by the server to identify the online content at the server prior to transmitting the online content to the computing device.

In another broad aspect of the present disclosure, there is provided a coordination server including a processor and a memory for storing instructions to coordinate online activity with broadcast television, wherein when the instructions are executed by the processor, the processor: reads a coordination index having an identifier for online content stored on an online content server, the online content being transmittable to a computing device for output on the computing device, and scheduling information of a broadcast event to be broadcasted on broadcast television, wherein the coordination index associates the scheduling information of the broadcast event with the identifier for the online content; based on the coordination index, generates a signal to indicate a broadcast status of the broadcast event; wherein, upon the signal being read by the online content server, the online content server transmits the online content to the computing device in accordance with one or more rules for interpreting the signal.

In some embodiments, the scheduling information includes a scheduled begin time for when the broadcast event is to be broadcasted on broadcast television. In some embodiments, prior to the scheduled begin time, the signal indicates that the broadcast event is about to be broadcasted. In some embodiments, at the scheduled begin time, the signal indicates that the broadcast event is being broadcasted live.

In some embodiments, the scheduling information includes a scheduled end time for when the broadcast event is to cease being broadcasted on broadcast television, and at the scheduled end time, the signal ceases to indicate that the broadcast event is being broadcasted live. In some embodiments, after the scheduled end time, the signal indicates that the broadcast event has recently been broadcasted.

In some embodiments, the coordination index includes additional scheduling information of additional broadcast events to be broadcasted on broadcast television, and wherein the scheduling information and the additional scheduling information includes sequence information for an airing order of the broadcast event and the additional broadcast events, without including schedule begin times for the broadcast event and the additional broadcast events.

In some embodiments, the coordination index includes additional scheduling information of additional broadcast events to be broadcasted on broadcast television, and the online content server stores additional online content, and the processor of the coordination server being further configured to: based on the coordination index, generate additional signals to indicate respective broadcast statuses of the additional broadcast events; wherein, upon the additional signals being read by the online content server, the online content server transmits the additional online content to the computing device in accordance with the one or more rules. In some embodiments, the additional scheduling information for one of the additional broadcast events indicates that one of the additional broadcast events is to be broadcasted on broadcast television during a time period immediately before the broadcast event, and during the time period, the signal for the broadcast event indicates that the broadcast event is to be broadcasted next.

In some embodiments, the processor is further to: receive an input that indicates whether the broadcast event is being broadcasted live on broadcast television; and insert the information from the input into the signal.

In some embodiments, the one or more rules provide that when the signal indicates the broadcast event is being broadcasted live, the online content server is configured to transmit the online content to the computing device so that the online content can be displayed synchronously.

In some embodiments, the one or more rules provide that when the signal indicates that the broadcast event has recently been broadcasted, the online content server is configured to transmit the online content to the computing device so that the online content can be outputted within an amount of time after the broadcast event was broadcasted live. In some embodiments, the one or more rules provide that when the signal indicates that the broadcast event is about to be broadcasted, the online content server is configured to transmit the online content to the computing device so that the online content can be outputted within an amount of time before the broadcast event is broadcasted live. In some embodiments, the amount of time in these scenarios can be selected from the group consisting of: 15 seconds, 30 seconds, 1 minute, 2 minutes, 5 minutes, 10 minutes, 15 minutes, 30 minutes, and 1 hour.

In some embodiments, the signal includes a timestamp for when the signal began to indicate that the broadcast event is being broadcasted live.

In some embodiments, the broadcast event includes a television advertisement. In some embodiments, the online content includes an online advertisement to be displayed within a browser application executing on the computing device. In some embodiments, the online content server includes an online advertisement service server configured to read the signal as an input for triggering when the online advertisement is to be served for display within the browser application.

In some embodiments, prior to the reading of the coordination index, the processor generates the coordination index by: loading campaign information including the identifier for the online content and a first campaign identifier associated with the online content; loading a roster file including the scheduling information of the broadcast event and a second campaign identifier associated with the broadcast event; and merging the roster file with the campaign information by associating the scheduling information of the broadcast event with the identifier for the online content when the first campaign identifier matches the second campaign identifier.

In some embodiments, the generated signal includes the identifier for the online content, and the identifier is used by the online content server to identify the online content at the online content server prior to transmitting the online content to the computing device.

In another broad aspect of the present disclosure, there is provided a computer readable medium storing instructions for execution by a processor at a server, wherein when the instructions are executed by the processor, the processor: reads a coordination index including: an identifier for online content stored on a server, the online content transmittable to a computing device for output on the computing device, and scheduling information of a broadcast event to be broadcasted on broadcast television, wherein the coordination index associates the scheduling information of the broadcast event with the identifier for the online content; based on the coordination index, generates a signal to indicate a broadcast status of the broadcast event; wherein, upon the signal being read by the server, the server transmits the online content to the computing device in accordance with one or more rules for interpreting the signal.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, certain steps, signals, protocols, software, hardware, networking infrastructure, circuits, structures, techniques, well-known methods, procedures and components have not been described or shown in detail in order not to obscure the embodiments generally described herein.

Furthermore, this description is not to be considered as limiting the scope of the embodiments described herein in any way. It should be understood that the detailed description, while indicating specific embodiments, are given by way of illustration only, since various changes and modifications within the scope of the disclosure will become apparent to those skilled in the art from this detailed description.

The embodiments of the methods described herein may be implemented in hardware or software, or a combination of both. In some cases, embodiments may be implemented in one or more computer programs executing on one or more programmable computing devices (e.g., the various devices and servers discussed below) including at least one processor (e.g., a microprocessor), a data storage device (including in some cases volatile and non-volatile memory and/or data storage elements), at least one communications interface (e.g., a network interface card for wired or wireless network communications), at least one input device, and at least one output device. For example and without limitation, the programmable computing devices may be a server computer, personal computer, laptop, personal data assistant, cellular telephone, smartphone device, tablet computer, smartwatch, and/or wireless device. Additional examples of programmable computing devices are also discussed below. Program code is applied to input data to perform the functions described herein and generate output information. The output information is applied to one or more output devices.

Those of skill in the art will understand that the following description of illustrative embodiments of the disclosure does not limit the implementation of embodiments of the disclosure to any particular computer programming language. For example, in some embodiments, each program, module, or application may be implemented in a high level procedural or object oriented programming and/or scripting language to communicate with a computer system. However, the programs can be implemented in assembly or machine language, if desired. In any case, the language may be a compiled or interpreted language.

More specifically, embodiments of the disclosure may be implemented in any computer programming language provided that the operating system (O/S) provides the facilities that may support the present disclosure. For instance, embodiments of the present disclosure may be implemented in part in the JAVA™ computer programming language (or other computer programming languages such as C, C++, C#, or Objective-C), but the web-related components of the present disclosure may more commonly be implemented using scripting languages typical for web development environments (e.g., JavaScript for client-side applications and PHP/Python/Perl for server-side applications). Additionally or alternatively, the embodiments of the present disclosure may be implemented using Microsoft™ development platforms such as the .NET platform. Those skilled in the art will also appreciate that any limitations presented by such an embodiment would be a result of a particular type of operating system or computer programming/scripting language and would not be a limitation of the present disclosure.

In some embodiments, the computing devices and methods as described herein may also be implemented as a transitory or non-transitory computer-readable storage medium configured with a computer program, wherein the storage medium so configured causes a computing device to operate in a specific and predefined manner to perform at least some of the functions as described herein. The medium may be provided in various forms, including one or more diskettes, hard disks drives (e.g. local or "cloud-based" solid state drives (SSDs)), compact disks, tapes, chips, wireline transmissions, satellite transmissions, internet transmission or downloadings, magnetic and electronic storage media, digital and analog signals, and the like. The computer useable instructions may also be in various forms, including compiled, non-compiled, bytecode, or other forms in which the instructions may be interpreted or translated.

Moreover, the subject system may be implemented as one or more software components stored on one or more computer servers that are accessible via one or more client machines in a client-server architecture. In such case, the system can be considered to be a hosted software offering or a software service in a software-as-a-service deployment.

Additional aspects and advantages of the present disclosure will be apparent in view of the description which follows.

Overview of Some Embodiments

Referring to FIG. 1, shown there generally as 100 is a block diagram of a system for coordinating online activity with broadcast television, in accordance with an embodiment of the present disclosure. The system 100 may include a broadcaster device 120 storing broadcast events to be broadcasted, an agency device 130 operated by a producer creating a coordinated campaign, a coordination server 140 that generates signals to indicate broadcast statuses of the broadcast events, an online content server 180 storing online content, and a computing device 110 that the online content is to be outputted on in a coordinated manner with the broadcast of the broadcast events. Each of the computing device 110, broadcaster device 120, agency device 130, coordination server 140, and online content server 180 may be connected to a communications network such as the Internet 190 for facilitating communications.

As used herein, the term "broadcast event" may include any type of subject matter that may be broadcasted on broadcast television. For example, as noted above, broadcast events may include a scheduled program, a sporting event, or a television advertisement. Also, as used herein, the term "online content" may include any electronic media that may be outputted at the computing device 110. For example, such content may include one or more audio clips, videos, text, graphics, or interactive user interfaces that are suitable for coordination with a given broadcast event.

At a high-level, the embodiments described herein generate signals from scheduling information for broadcast events indicated on a roster file. The signals can be read by servers to trigger the output of online content in coordination with the broadcasting of the broadcast events. As used herein, the term "scheduling information" refers to any information relating to the timing of when broadcast events will be aired. For example, such scheduling information may include scheduled begin and end dates/times for broadcast events. Alternatively, the scheduling information may only include a sequence of broadcast events indicating the order in which broadcast events are to be aired (without fixed timestamps of when they are expected to air).

Producers of the broadcast events may wish to coordinate their online activities with corresponding broadcast events. For example, an ad agency may create a multi-platform campaign to advertise a certain good/service. The campaign may include a television spot. It may also include online content to be delivered to computing devices 110.

While the examples discussed herein relate primarily to embodiments where online advertisements are coordinated with television advertisements, the described systems and methods may also be used to allow for coordination of online activity with a television show being broadcasted on broadcast television. For example, such embodiments may be desirable if a producer of a given television show would like to provide a media experience where there is additional content besides what is being broadcasted. For example, such additional content may include background information on a scene in a television show being broadcasted, statistics for sports team competing during a broadcasted sporting event, or an interactive user interface that allows feedback to hosts during a live broadcasted event.

Referring still to FIG. 1, the computing device 110 may be various programmable computing devices (examples of which were noted above) that are configured with an application that is capable of outputting suitable online content that may be coordinated with a given broadcast event. For example, the computing device 110 may be provided with a web browser application 112 that is configured to display webpages having embedded online advertisements that are received from the online server 180 in accordance with the signals generated by the coordination server 140 discussed below. In alternate embodiments, the application that outputs the online content may be a dedicated standalone application or other suitable process or thread executing on the computing device 110.

The broadcaster device 120 may be a suitable computing device having an event database 122 storing broadcast events 124 to be broadcasted on broadcast television. In various embodiments, the broadcasting may be performed by way of an Over-the-Air (OTA) transmission (e.g., via antenna 126). As used herein the term "broadcast" includes broadcast events that are distributed via a non-OTA proprietary network such as cable. As will be understood by a person skilled in the art, broadcast events may be national, local, or specific to a cable channel. Moreover, while broadcast television has traditionally been transmitted for receipt and viewing on a "television" set, other types of devices that may receive and output information from a broadcaster device 120 are within the contemplate of the present embodiments. For examples, these other types of devices include any device that can receive a broadcast transmission. For example, these may include any type of computing device capable of streaming media, including "smart" billboards.

The agency device 130 may be a suitable computing device for accessing the agency module 156 of the coordination server 140. As discussed in greater detail below, the agency module 156 may allow a user at an ad agency (e.g., someone managing an advertising campaign) to provide information related to the online content that corresponds to broadcast events, so that it may be used for creation of a coordination index. Example user interfaces that may be provided by the agency module 156 are discussed below with respect to FIGS. 6A-6D.

The coordination server 140 may be a suitable computing server that is configured to execute a number of modules for providing the software functionality described herein. These modules may include a broadcast module 152, an index generation module 154, an agency module 156, and a signaling module 158. These various modules may be in communication with a roster file database 162 storing roster files 172, a campaign information database 166 storing campaign information 176 related to online content stored on online content server 180, and a coordination index database 168 storing coordination indices 178.

The broadcast module 152 of coordination server 140 may be accessed by a member of the broadcaster, so as to configure and/or monitor the coordination index as signals providing broadcast statuses of broadcast events are being generated. For ease of illustration, the broadcaster device 120 is illustrated as communicating with the broadcast module 152 of coordination server 140 in the system of FIG. 1. However, in alternate embodiments, there may be a separate computing device (different from the one that contains the event database 122 and is connected to the antenna 126) from which the broadcaster interface provided by the broadcast module 152 may be accessed. Example user interfaces that may be provided by the broadcast module 152 are discussed below with respect to FIGS. 7A to 7D.

Using the user interface accessible via the broadcast module 152, a user using broadcaster device 120 may be able to upload a roster file 172 containing scheduling information for broadcast events 124 to be broadcasted at the broadcaster. The roster file 172 may be a roster of the available broadcast events to be broadcasted by the broadcaster. In various embodiments, the scheduling information contained in the roster file 172 may include particular timestamps for when certain broadcast events are expected to air. For example, this may be the case if the broadcast events are TV spots intended to be aired in between television programming airing at particular times. As noted above, in alternate embodiments, the scheduling information may only include a sequence of broadcast events (without fixed timestamps of when they are expected to air). For example, this may occur if the broadcast are TV spots intended to be aired during commercial breaks of a live event (e.g., a sporting event), and the precise time when the TV spots are to be aired is not known. In this example where only sequence information is contained in the roster file 172, the roster file 172 may also be considered a 'playlist' of the available broadcast events that may be played, paused, and resumed. The roster files 172 may also contain campaign identifiers associated with the broadcast events 124, to indicate the campaign that the broadcast events 124 are associated with. Roster files 172 from different broadcasters may be stored in roster file database 162.

Using the user interface accessible via agency module 156, a user using agency device 130 may upload or input data relating to the online content that is to be coordinated for output with the broadcast events 124 to be broadcasted. For example, this may include information including identifiers for online content 188 stored on the online content server 180 and/or login credentials that allow the signaling module 158 to access the agency account on the online content server 180. As with the roster files 172 from the broadcaster, the campaign information 176 may also contain campaign identifiers associated with the various online content 188. Campaign information 176 from different agencies may be stored in campaign information database 166.

For ease of explanation, the term "agency" is generally used herein (e.g., in describing agency device 130, or the agency module 156 of the coordination server 140) to refer to an entity who may be managing the coordination of the broadcast events 124 and the deployment of the online content 188. In various embodiments, the agency may be ad agency managing an advertisement campaign to coordinate television advertisement with online advertisement. However, in various embodiments, the "agency" may be a producer of a television show who desires to coordinate the contents of a television show with corresponding online activity in a multi-platform coordinated (e.g., synchronized) experience.

Similarly, the term "campaign" is used herein to generally refer to any type of endeavor that is desired to have coordinated media output between broadcast television and online activity. In various embodiments, the campaign may refer to an advertisement campaign. However, in various embodiments, the "campaign" may refer to a television show or sporting event where coordinated activity is desired.

The index generation module 154 may generate coordination indices 178 for storage into the coordination index database 168. As discussed in greater detail below with respect to FIG. 2, this may involve loading roster files 172 from the roster file database 162 and campaign information 176 from campaign information database 166, and merging them based on matching campaign identifiers. The coordination indices 178 may be stored in coordination index database 168. A given coordination index 178 may contain information related to a broadcast status of when a given broadcast event 124 for a campaign is to be aired. At the same time, the coordination index 178 may also contain information identifying online content 188 that is to be outputted at a computing device 110 in coordination with the broadcast event 124. An example coordination index 178 is shown in FIGS. 3A-3C and will be discussed in greater detail below.

The signaling module 158 may read the coordination indices 178 stored in the coordination index database 168 to generate signals that indicate the broadcast status of broadcast events 124. As discussed in greater detail below, the content Application Programming Interface (API) 182 may read the generated signals and transmit the online content 188 to the computing device 110 according to one or more rules for interpreting such signals. For example, the signal may indicate that a given broadcast event 124 is being broadcasted live.

While the broadcast module 152, index generation module 154, agency module 156, and signaling module 158 are illustrated and discussed herein as separate modules, it will be appreciated that in alternate embodiments, the functionality provided by the different modules may be combined together into a single module or further separated into more than the described four modules, depending on the nature of the implementation. Similarly, although the roster file database 162, campaign information database 166 and coordination index database 168 in the coordination server 140 are described and illustrated as being stored in distinct and separate databases, in alternate embodiments, the different types of data may be stored together. Moreover, although a single device or server is shown in FIG. 1 for any given named device or server, the processing described as being performed by such device or server may be spread amongst any number of suitable devices or servers.

In various example embodiments, the coordination server 140 may a dedicated server computer, mainframe, computer cluster, cloud-computing service or like computing resource. In various embodiments, the components of the coordination server 140 may be implemented using a web technology stack such as LAMP (e.g., use of the Linux operating system, Apache web server, MySQL relational database management system, and the PHP programming language), or Microsoft™ technologies such as a the .NET framework, SQL Server™ database, and Internet Information Services (IIS™) web server. Various types of database technologies (e.g., MySQL, Oracle™, or IBM DB2™) may be used to provide the database(s) described herein. As will be understood by a person skilled in the art, variations in the technologies used to implement the described inventions may be possible.

Online content server 180 may be a server providing a content API 182 that is configured to retrieve the online content 188 stored in the online content database 186, and transmit it to the computing device 110 for output thereon (e.g., via browser application 112 or other suitable application). The content API 182 may be configured to read the signals that indicate the broadcast statues of broadcast events 124, as provided by the signaling module 158 on coordination server 140. In embodiments where the online content are online advertisements to be coordinated for output at the computing device 110 with corresponding broadcast events 124, the online content server 180 may be a server operated by an advertisement service provider. Examples of such online advertisement services include Google™ DoubleClick™, Facebook™ Twitter™, AOL™, Yahoo™, SnapChat™, Instagram™, Inbox by Gmail™ and/or MSN™. As will be understood by persons skilled in the art, these types of advertisement service providers may be configured to serve ads within external web pages (e.g., in the case of Google™ DoubleClick™), or within a native application or service provided by the advertisement service provider (e.g., in the case of Facebook™ or Twitter™).

The content API 182 may be configured to read the signals provided by the signaling module 158 in a variety of ways. In some embodiments, signals may be provided at a designated Uniform Resource Locator (URL), and the content API 182 may be configured to monitor the URL to determine when a signal has been updated with broadcast status information (e.g., when a given broadcast event 124 goes live). Such a configuration may be considered to be an implementation where the content API 182 "pulls" the signal from the signaling module 158. In such embodiments, the URL may be configured to include an event identifier for the broadcast event 124 to which the signal relates. The URL may also include a content identifier usable by the content API 182 to identify the online content 188 that is to be transmitted to the computing device 110 in a coordinated manner as a result of the broadcast status indicated in the signal. Such a URL may be seeded with the content API 182 prior to signals being generated, for example, if the agency device 130 logs into the content API 182 and enters such a URL into a user interface that allows the entering of trigger URLs that can be monitored by the content API 182 for determining when to transmit the online content 188 to the computing device 110.

Additionally or alternatively, the content API 182 may be configured with an available call that can be invoked by the signaling module 158 when there is broadcast status information in a given signal. The invocation of such an API call may provide the broadcast status information to the content API 182, so as to allow the content API 182 to interpret the information and provide the online content 188 to the computing device 110 accordingly. Such a configuration may be considered to be an implementation where the signaling module "pushes" the signal to the content API 182.

In further embodiments, instead of sending broadcast status information to the content API 182, the signaling modules 158 may simply invoke different API calls available from the content API 182 as a way of simultaneously providing the signal and interpreting the broadcast status information contained within the signal. For example, if the content API 182 has an API call available for immediately launching some particular piece of online content 188, then the signaling module 158 being configured to invoke such an API call may be considered as being both a signal to indicate that a given broadcast event 124 is being broadcasted live, and an interpretation of that signal to immediately transmit the online content 188 to the computing device 110 so that it may be outputted thereon synchronously with the airing of the broadcast event 124.

An example of this type of embodiment is the API made available by Google™ DoubleClick™ to input a start date/time and end date/time of a campaign that is registered with the DoubleClick™ platform. In such embodiments, the signaling module 158 may be configured to input the start date/time and end date/time to such API to coordinate the going live of the campaign in conjunction with the broadcast event 124. For example, the start date/time and end date/time from the roster file 172 for a given broadcaster event may be inputted to the API to cause the campaign to be triggered to go live at the same time as the broadcast event, if it is desired that the two be outputted simultaneously.

In various embodiments, to authenticate the signaling module 158 for the purpose of allowing it to provide signals to the content API 182, the coordination server 140 may also be provided with the login credentials for a given online content account at the online content server 180. This credential information may then be included in the information provided by the signaling module 158 to the content API 182 when providing signals, so that the content API 182 can confirm that the signal information originates from a reliable source that is authorized to control deployment of the online content 188. In some embodiments, a given account at the content API 182 (e.g., as is the case with the Google™ DoubleClick™ advertising service provider) may be configured to able to provide different account types that have varying degrees of access rights. For example, some account types may have the ability to create and edit online content 188, whereas certain other account types may only have the ability to trigger the sending of the online content 188 to the computing device 110. In such embodiments, the login credentials provided to the coordination server 140 may be of an account type that has a minimal amount of access (e.g., potentially created solely for usage by the coordination server 140) so as to safeguard the online content 188 from using login credentials with a higher amount of access to accidentally or maliciously corrupt the online content 188.

Additionally or alternatively, the coordination server 140 may itself be provided with an API (not shown in FIG. 1) that can be accessed by the online content server 180. For example, the coordination server 140 may be configured to provide software functionality through such an API that can be invoked by the online content server 180 to retrieve signal information. Such an embodiment may be considered another embodiment where the online content server 180 "pulls" the signal information from the coordination server 140.

Internet 190 is illustrated in FIG. 1 as an example of a communications network that may facilitate communications amongst the devices and servers shown. However, it will be understood by persons skilled in the art that other communications networks may also be possible. For example, the communication of messages described in the current disclosure may be performed (either wholly or partially) through proprietary or private networks, or cellular networks.

As shown in FIG. 1, the index generation module 154, roster file database 162, and campaign information database 166 are illustrated as being provided within the coordination server 140. However, in alternate embodiments, one or more of these components may be provided at the broadcaster device 120. For example, in a configuration where the index generation module 154 is provided at the broadcaster device 120, the generation of the coordination index 178 can be performed at the broadcaster. The roster file database 162 may then reside locally within the broadcaster's premises without the coordination server 140 needing to store the raw roster files 172 from which the coordination indices 178 are created. Similarly, the broadcaster device 120 may additionally or alternatively also have a campaign information database 166 for storing campaign information 176 as received from an agency device 130. If so, the campaign information 176 may be loaded directly to broadcaster device 120 from an agency device 130. Alternatively, the campaign information database 166 may remain at the coordination server 140 to store campaign information 176 uploaded thereto from the agency device 130, and the broadcaster device 120 may download the campaign information 176 from the campaign information database 166 via a suitable user interface provided via the broadcast module 152.

If the coordination index 178 is to be generated at the broadcaster device 120, then the broadcast module 152 may be configured to provide a suitable user interface for uploading a generated coordination index 178 to the coordination server 140 for storage in coordination index database 168.

In further embodiments, the index generation module 154 may not be provided in the system 100 at all. For example, in such embodiments, the coordination index 178 may be generated by a process outside of the system 100, and simply uploaded to the coordination server 140 for storage in the coordination index database 168. As discussed in more detail in relation to FIG. 2, in such embodiments, the optional steps related to loading roster files 172 and campaign information 176 for the purpose of generating coordination indices 178 need not be performed, and the signaling module 158 may proceed directly with reading an uploaded coordination index 178 stored in the coordination index database 168.

In still other embodiments, one or more of the various components shown as being provided in the coordination server 140 may all be incorporated within the broadcaster device 120. In such case, the broadcaster device 120 may perform the various acts described herein as being performed by the components of the coordination server 140. The broadcaster device 120 may then be considered the coordination server 140 and communicate directly with the online content server 180. Alternatively, in some embodiments, one or more of the of the various components shown as being provided in the coordination server 140 may all be incorporated within the online content server 180. In such case, the online content server 180 may be considered as being the coordination server 140, and the various components being provided within the online content server 180 may communicate internally within the online content server 180 itself.

Figure 2:
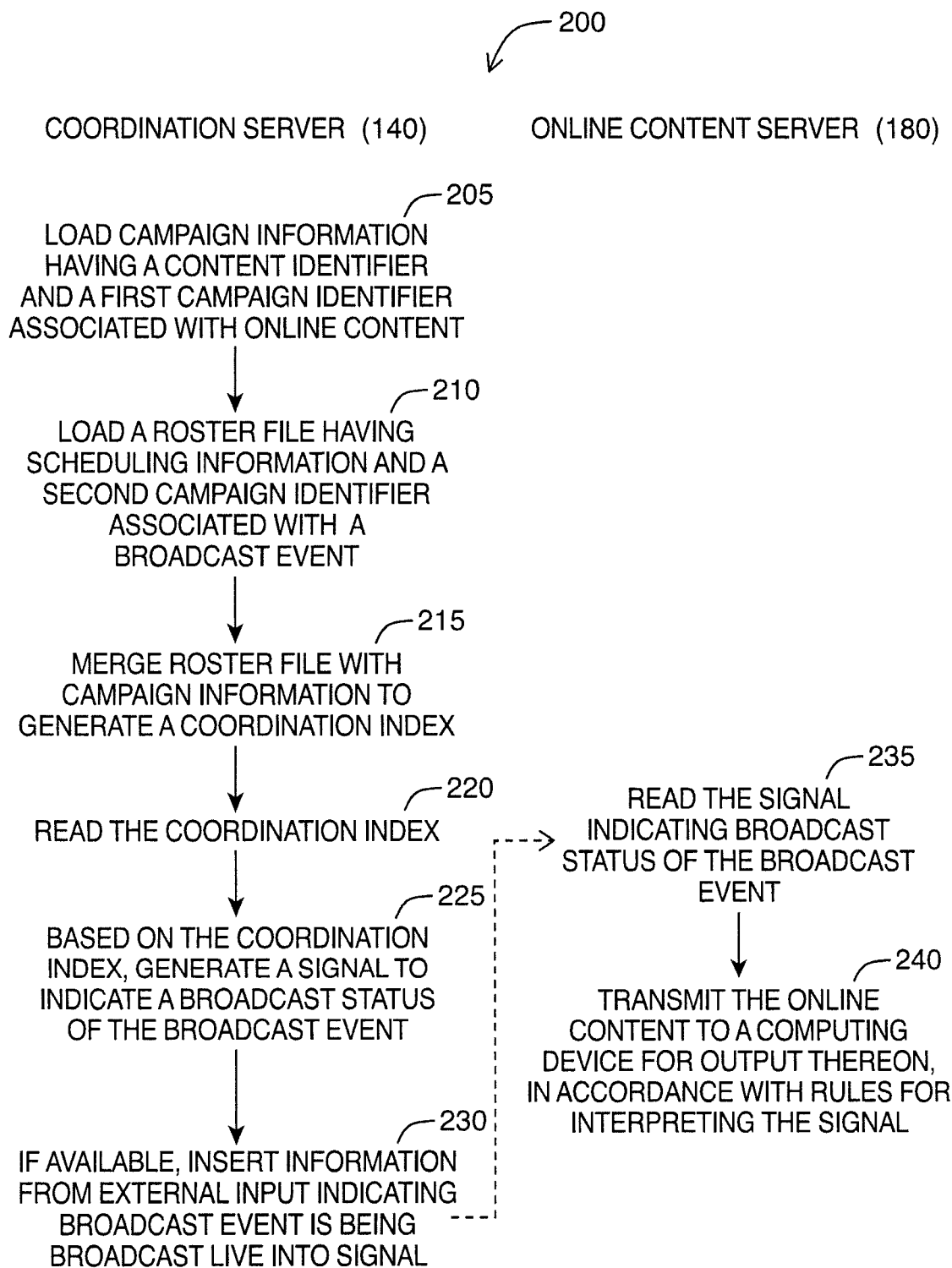
FIG. 2 is a flowchart diagram illustrating steps performed by a coordination server and an online content server during a method of coordinating online activity with broadcast television, in accordance with at least one embodiment of the present invention.
Figure 3A:
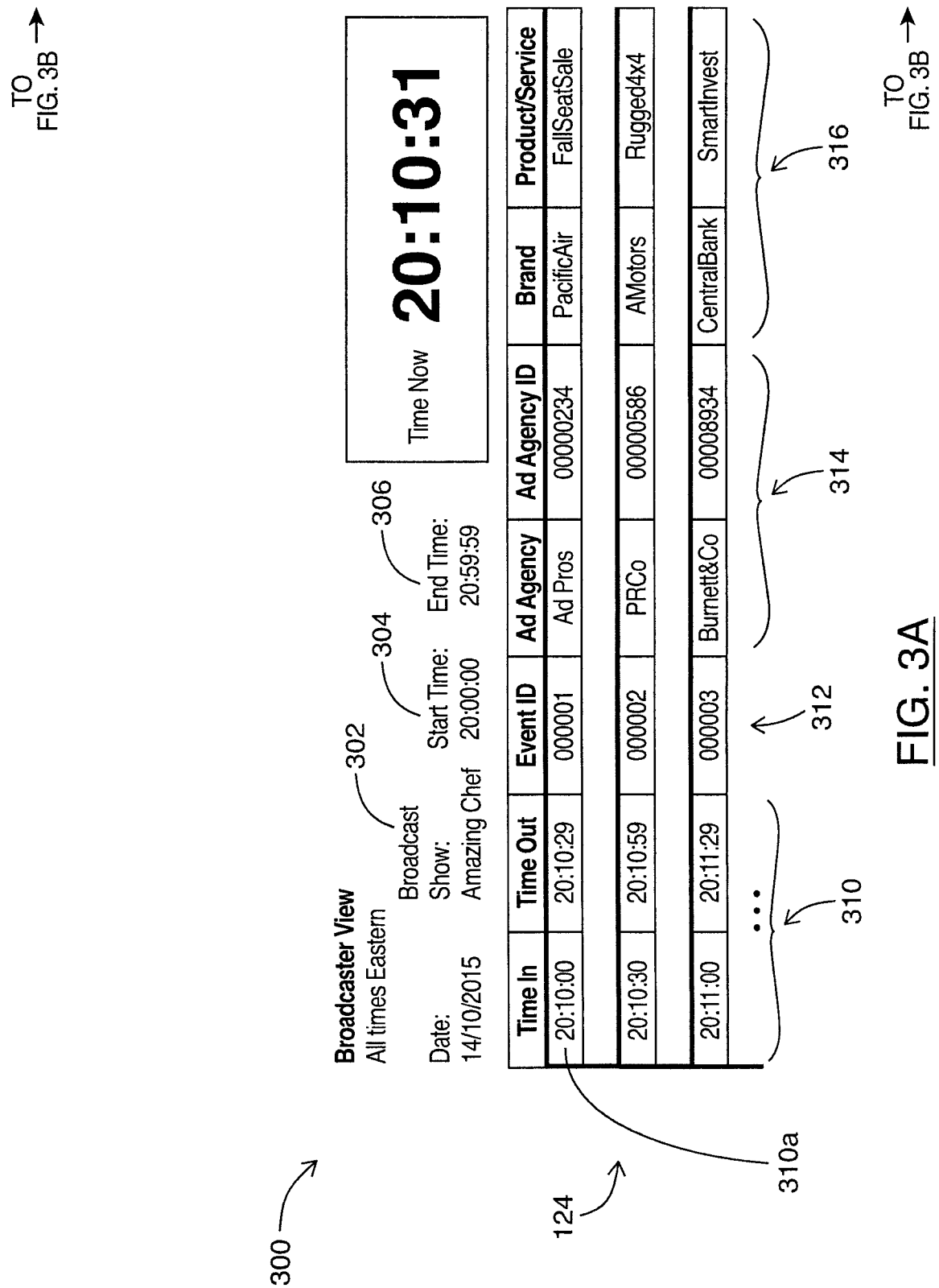
Figure 3C:
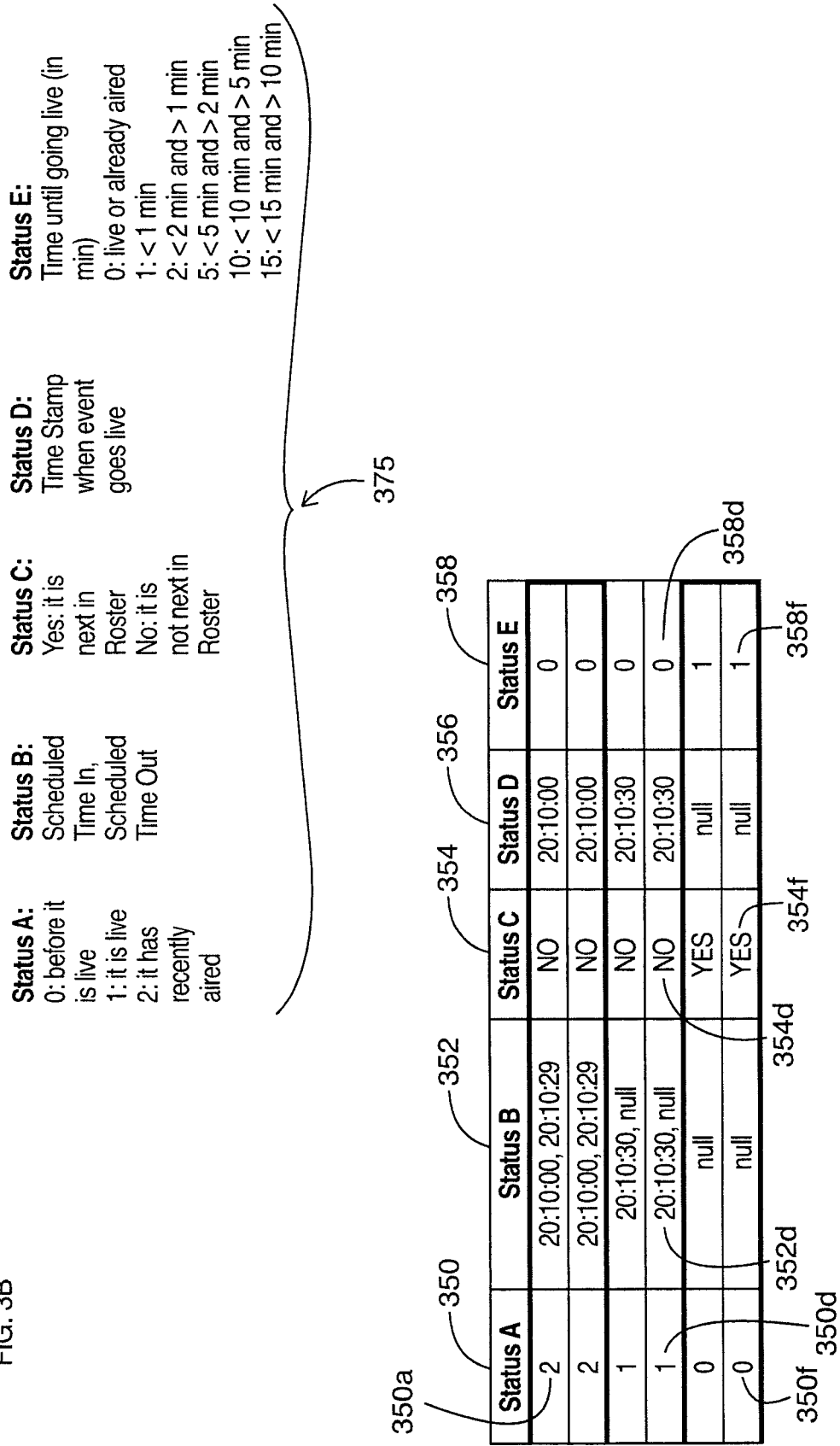

Generating a Coordination Index and Signals for Indicating Broadcast Statuses of Broadcast Events Referring to FIG. 2, shown there generally as 200 is a flowchart diagram illustrating steps performed by a coordination server 140 and an online content server 180 during a method of coordinating online activity with broadcast television, in accordance with at least one embodiment of the present invention. In describing the steps of FIG. 2, reference will simultaneously be made to the various components shown in FIG. 1 and the table shown in FIGS. 3A-3C. As illustrated, FIG. 2 shows the interactions between the coordination server 140 and the online content server 180. In some embodiments, the steps described as being performed by the coordination server 140 may be performed by a processor provided on the coordination server 140, executing the index generation module 154 and/or the signaling module 158. Similarly, the steps described as being performed by the online content server 180 may be performed by a processor provided on the online content server 180, executing the content filter API 182.

In the flowchart of FIG. 2, steps 205-215 relate to the generation of the coordination index 178 by the index generation module 154 and steps 220-240 relate to the generation of signals indicating broadcast statuses of broadcast events and the reading thereof by the online content server 180. As discussed above, steps 205-215 related to the generation of the coordination index 178 are optional and may not be performed in some embodiments where the coordination index 178 is simply uploaded to the coordination server 140. In such cases, the method 200 may start at step 220.

At step 205, the coordination server 140 may load campaign information having an identifier for online content and a first campaign identifier associated with the online content 188. As discussed above, this may be performed by the index generation module 154 reading the campaign information 176 from campaign information database 166.

At step 210, the coordination server 140 may load a roster file having the scheduling information of a given broadcast event 124 and a second campaign identifier associated with the broadcast event 124. As discussed above, this may also be performed by the index generation module 154 reading roster files 172 previously uploaded to the roster file database 162 from a broadcaster device 120. As noted, the scheduling information may include a scheduled begin time for when the broadcast event is to be broadcasted on broadcast television and/or a scheduled end time for when the broadcast event is to cease being broadcasted on broadcast television.

At step 215, the coordination server 140 may merge the loaded roster file 172 with the loaded campaign information 176 to generate a coordination index 178. This may be performed by associating the scheduling information of the broadcast event 124 with the identifier for the online content in situations where the first campaign identifier in the entries from the roster file 172 match the second campaign identifier in the entries from the campaign information 176.

The resultant coordination index 178 will thus have a merged data set that contains both scheduling information for broadcast events 124, as well as content identifiers for online content 188 that belong to the same campaign. As will be understood by persons skilled in the art, the loading and merging of steps 205-215 may be performed for multiple roster files 172 and campaign information 176. This may allow a given coordination index 178 to potentially include additional scheduling information of additional broadcast events 124 to be broadcasted on broadcast television, and content identifiers for corresponding additional online content 188 that may be stored on an online content server 180.

At step 220, the coordination server 140 may read the generated coordination index 178 from step 215 that associates scheduling information of one or more broadcast events 124 with identifiers for online content 188 that is transmittable to a computing device 110 for output thereon.

At step 225, the coordination server 140 may, based on the coordination index 178 read in step 220, generate a signal to indicate a broadcast status of the broadcast event 124. In situations where the coordination index 178 contains merged information for multiple broadcast events 124 and/or campaigns, step 225 may also include generating additional signals to indicate respective broadcast statuses of the additional broadcast events 124.

Referring simultaneously to FIGS. 3A-3C, shown there generally as 300 is a table illustrating the reading of an example coordination index 178 and the generation of signals indicating broadcast statuses of broadcast events 124, in accordance with at least one embodiment of the present invention. The table 300 of FIGS. 3A-3C is spread over three pages, starting on the left in FIG. 3A and spanning towards the right in FIGS. 3B and 3C. The information that would appear in the coordination index 178 is shown in FIGS. 3A and 3B, and the signal information is shown in FIG. 3C. For ease of illustration, and to better show how the data in the coordination index 178 affects the signals being generated, both the coordination index 178 and the signals are shown together in one table in FIGS. 3A-3C. However, in operation, the signaling mechanism may be provided separately from the coordination index 178 which contains the information related to the broadcast events 124 and online content 188 (e.g., the coordination index may simply be read, and the signals outputted via a URL, as noted above).

Additionally, in various embodiments, the coordination index 178 itself may not necessarily be provided in a single table. In such embodiments, the data related to the broadcast events 124 and online content 188 may be spread across multiple tables or in other suitable data storage mechanisms that allow for association of such data.

The coordination index 178 of FIGS. 3A-3B is for an example scenario where the broadcast events 124 are television advertisements to be displayed during a commercial break of a television show being broadcasted on broadcast television. As shown in FIG. 3A, the coordination index 178 may be specified for a particular date (e.g., "14/10/2015"), and a broadcast show 302 (e.g., "Amazing Chef") that is to be broadcasted between a given start time 304 (e.g., "20:00:00") and end time 306 (e.g., "20:59:59").

The data shown in FIG. 3A may generally be obtained from the roster file 172 portion of the coordination index 178. For example, shown in FIG. 3A is an excerpted listing of broadcast events 124 (e.g., television advertisements) that are to be aired, along with associated information including scheduled begin and end times 310 of the advertisements (e.g., shown as "Time In" and "Time Out" columns), an event identifier 312 for the broadcast events 124, the ad agencies and corresponding identifiers 314 associated with the broadcast events 124, and a brand and product/service being marketed in the television advertisement 316. In various embodiments, the ad agency identifier may be a unique identifier assigned to an ad agency user by the coordination server 140. For example, the ad agency identifier may be used to identify a given ad agency user when the agency device 130 accesses the agency module 156 of the coordination server 140. The ad agency identifier may also be used, for example, to help identify campaign identifiers when generating a coordination index (e.g., campaign identifiers may typically be associated with a given ad agency, and not necessarily unique amongst all campaign identifiers).

Referring now to FIG. 3B, the data shown are further columns of the table 300 that starts in FIG. 3A. Specifically, the first two rows of the table in FIG. 3B are associated with the first broadcast event shown in FIG. 3A (scheduled to be aired between "20:10:00" and "20:10:29"); the third and fourth rows of the table are associated with the second broadcast event shown in FIG. 3A (scheduled to be aired between "20:10:30" and "20:10:59"); and the fifth and sixth rows are associated with the third broadcast event shown in FIG. 3A (scheduled to be aired between "20:11:00" and "20:11:29"). The information shown in FIG. 3B generally relates to the online content 188 as may be obtained from the campaign information 176 stored in the campaign information database 166.

As shown, the online content information may include: the name of the online advertising service providers 320 providing the content API 182 (shown as an "Online Ad Network" column); campaign identifiers 322; login credentials for communicating with the online content API 182 (e.g., a "Ad Service Login" 330 and password 332); content identifiers 340 for the online content 188 stored at the online content server 180 that is to be coordinated with the broadcast events 124; and localization parameters 380 that may be used to provide parameters for the geographical location of the computing devices 110 where the online content 188 is deployed.

As shown in FIGS. 3A and 3B, multiple rows relating to different types of online content 188 may be associated with a single broadcast event 124. For example, the third television advertisement shown in FIG. 3A (shown as being scheduled to be aired between "20:11:00" and "20:11:29") is associated with online content 188 at two different advertisement service providers: namely, Google DoubleClick™ and Twitter™. Although the system of FIG. 1 shows only a single online content server 180, it will be understood by persons skilled in the art that each advertisement service provider may have its own separate online content server 180. Accordingly, while each piece of online content 188 is associated with the same campaign identifier 322, they may each be associated with their own login credentials 330, 332 for accessing their respective online content server 180. They may each also be associated with their own content identifier 340, which is to be used at the online content server 180 to identify the online content 188 in a given online content database 186.

In another example, there may be multiple different pieces of online content 188 for deployment from a single online content server 180 for a given campaign. This may be performed, for example, to have geographically-customized pieces of online content 188 appearing on the same advertisement service provider. For example, the two pieces of online content 188 are shown in FIG. 3B as being associated with the first broadcast event 124 of FIG. 3A are both to be deployed using the Google DoubleClick™ advertisement service provider (e.g., at 320a, 320b). They are both also associated with the same campaign identifier 322, and login credentials 330, 332. However, each has its own content identifier 340 and is provided with localization parameters 380 that indicate that the first piece of online content 188 is to be outputted on computing devices 110 in Canada only (e.g., at 380a) whereas the second piece of online content 188 is to be outputted only on computing devices 110 in the United States (e.g., at 380b).

Such customization of online content 188 may be desirable, for example, to allow ad agencies to provide locally relevant content that coordinates with broadcast events. For example, in the scenario shown in FIGS. 3A and 3B, the broadcast advertisement is to market a 'Fall Seat Sale' provided by an airline, PacificAir. By providing the ability to coordinate the deployment of online advertisements that are customizable by geography, an agency may be able to display an online ad to Canadian computing devices 110 that directs to a Canadian website (e.g., for which purchases may be valued in Canadian dollars). Similarly, the agency may be able to display an online ad to U.S. computing devices that directs to a U.S. website (e.g., for which purchases may be valued in U.S. dollars).

In a further example, the selections of the online advertisement service provider 320 and the localization parameters 380 may be coordinated to achieve an audience that is even more targeted. In one implementation, both the advertisement service provider 320 and the location parameters for where the online content 188 is to be deployed may be configured to be directed at particular demographics. For example, this is the case for the online advertisements illustrated in the third and fourth rows in FIG. 3B, which are associated with the second broadcast event of FIG. 3A. As shown, the third online advertisement 188 is to be deployed using the Instagram™ advertising service provider 320c in the geographical locations of Chicago, New York City (NYC), and Los Angeles (LA) (e.g., at 380c). However, the fourth online advertisement 188 is to be deployed using the AOL™ advertising service provider 320d in the geographical locations of Palm Springs and Ft. Lauderdale (e.g., at 380d). In doing so, the agency running the campaign may be able to have the coordinated online ads intended to be consumed by younger, urban audiences run in the third online advertisement slot (e.g., because the agency believes younger audiences may be more likely to be using the Instagram™ service, and urban audiences are likely to reside in the large cities of Chicago, NYC, and LA). Similarly, the agency may run the online ad intended to be consumed by a more mature audience in the fourth online advertisement slot (e.g., because the agency believes that more mature audiences may be more likely to reside in the cities of Palm Springs and Ft. Lauderdale where retirees commonly live, and because they believe such audiences may be more likely to use the AOL™ service).

In various embodiments, the location parameters 380 may be considered as being provided in the signal information provided to the content API 182 that informs the content API 182 how to deploy the corresponding online content 188. For example, in situations where the content API 182 can be configured to read that information from an external source, a person that is part of the ad agency may log into the content API 182 and provide a URL or similar resource locator to the content API 182 so that the location parameters 380 may be configured to be read by the content API 182 upon a signal being provided to the content API 182. Additionally or alternatively, the content API 182 may have a separate API call that can be invoked by the signaling module 158 to provide the location parameters 380 with respect to a given piece of online content 188. In yet further embodiments, the content API 182 call for causing a piece of online content to be deployed may itself provide parameters within the invocation call that allow for specification of geographical locations for how the online content 188 is to be deployed.

In some embodiments the localization parameters 380 may be entered via a suitable user interface provided by the agency module 156 on the coordination server 140 when accessed by the agency device 130. Additionally or alternatively, the coordination server 140 may be configured to provide suggestions for such localization parameters 380 from information about whether a broadcast event is to be broadcasted on a regional or local network affiliate of a national broadcaster. As will be understood by persons skilled in the art, in various regions in North America, national broadcaster networks (e.g., in the U.S., ABC™, NBC™, or CBS™; or in Canada, Global™ or CTV™) may be have local or regional network affiliates that agree to carry some or all of the television programs of the national broadcaster. In various embodiments, the roster file 172 used to generate the coordination index 178 may contain an indication of whether the roster file 172 is for a network affiliate and the geographical coverage of the network affiliate. This information may then be used as a basis for providing the localization parameters 380 that can be used to configure the geographical locations of where the online content 188 is to be deployed.

Referring to FIG. 3C, the data shown are further columns of the table that starts in FIG. 3A and continues to FIG. 3B. As with the portion of the table shown in FIG. 3B, the first two rows of the table in FIG. 3C are associated with the first broadcast event of FIG. 3A; the third and fourth rows of the table are associated with the second broadcast event of FIG. 3A; and the fifth and sixth rows are associated with the third broadcast event of FIG. 3A. While the information shown in FIGS. 3A and 3B generally relate to the coordination index 178, the information shown in FIG. 3C show the various broadcast status information that may be generated in a signal based on the coordination index 178. As noted above, the signal information is shown in a table format as being appended to the coordination index 178 for ease of illustration. However, in operation, the signaling mechanism may be provided separately from the coordination index 178 itself.

In the examples shown, different types of broadcast statuses are shown: Status 'A' 350, Status 'B' 352, Status 'C' 354, Status 'D' 356, and Status 'E' 358. The differing types may not be mutually exclusive and may convey overlapping information. In various embodiments, each status may be used by the content API 182 for different purposes, as discussed below. A legend 375 is provided on FIG. 3C that outlines the information conveyed by each status.

Status 'A' 350 provides an indication of three different states of a given broadcast event: the broadcast event is about to be broadcasted ('0'), the broadcast event is being broadcasted live ('1'), and the broadcast event has already been broadcasted live ('2'). These statuses can be generated based on the scheduled begin and end times 310 in the scheduling information for a broadcast event 124 in the coordination index 178. For example, referring simultaneously back to FIG. 3A, there is a "Time Now" indicator indicating that a current time is "20:10:31". Thus, for the first broadcast event shown in FIG. 3A (which is scheduled to be aired between "20:10:00" and "20:10:29"), the signaling module 158 of the coordination server 140 may determine this broadcast event 124 has recently aired and provide a status 350a of '2' for the two online events 188 associated with that broadcast event 124. Similarly, for the second broadcast 124 event of FIG. 3A, the signaling module 158 of the coordination server 140 may determine this broadcast event 124 is currently being broadcasted live based on the current time. As a result, the status 350*d* may be set to '1' for the two online events associated with this broadcast event 124. For the third broadcast event shown in FIG. 3A, it may be determined that this broadcast event has not yet been broadcasted live and so the status 350*f* may be set to '0' for the two online events associated with this broadcast event 124.

As the current time in the system 100 proceeds, the signaling module 158 may be configured to update the signals. For example, upon the current time reaching "20:11:00", the statuses 'A' 350 associated with the second broadcast event shown in FIG. 3A may be updated to cease indicating that the broadcast event is being broadcasted live (e.g., it can be updated to '2' to indicate that such broadcast event has recently aired). Similarly, the statuses 'A' 350 associated with the third broadcast event shown in FIG. 3A may be updated to '1' to indicate that it is being broadcasted live.

Status 'B' 352 provides information related to the scheduled begin and end times of a given broadcast event 124. In the example shown in FIGS. 3A-3C where the current time is "20:10:31", entries in the status 'B' 352 column associated with the first broadcast event of FIG. 3A show both the scheduled begin and end times that were originally provided in the roster file 172 as both such times have passed. For entries in the status 'B' 352 column associated with the second broadcast event 124 of FIG. 3A, only the scheduled begin time 352*d* of "20:10:30" may be shown. A 'null' character is shown for the scheduled end time because it has not been passed yet. For the entries in the status 'B' column 352 associated with the third broadcast event shown in FIG. 3A, only a 'null' character is shown with no timestamps because neither the scheduled begin time nor the scheduled end time has passed yet.

Status 'C' 354 provides a simple binary flag for indicating whether a given broadcast event 124 is next in sequence to be broadcasted live at the broadcaster. In various embodiments, the information in this status 'C' 354 can be generated from the scheduling information originally found in the roster file 172. For example, upon scanning the scheduling information for the various broadcast events 124 shown in FIG. 3A, the signaling module 158 may determine that for a given broadcast event 124 (e.g., the third broadcast event 124 shown in FIG. 3A), the second broadcast event of FIG. 3A is to be broadcasted live during a time period immediately before the third broad broadcast event 124 of FIG. 3A. The signaling module 158 may then determine that the current time period is in fact during such time period, and therefore indicate that such broadcast event (e.g., the third broadcast event shown in FIG. 3A) is to be broadcasted next. This is shown in FIG. 3C where the status 'C' columns 354 associated with the third broadcast event shown in FIG. 3A have a 'YES' in them (e.g., 354*f*). The remainder of the values in the Status 'C' column 354 associated with the other broadcast events have a 'NO' because they would not be the next broadcast event to be broadcasted live (e.g., 354*d*).

Status 'D' 356 provides a timestamp of when the signal began to indicate that the broadcast event 124 is being broadcasted live. In situations where this information is generated solely based on the scheduled begin and end times 310 from FIG. 3A, the values in this column will reflect the same values as the first value of the entries in the Status 'B' column 352. This is what is shown in FIG. 3C. However, in embodiments where there is an external input indicating when the actual broadcast event 124 is being broadcasted live (as discussed below) and that input overrides the signal generated based on the scheduled information for a broadcast event, then the Status 'D' 356 information may be configured to provide the exact timestamp when the input was provided.

Status 'E' 358 provides different categories for ranges of times until a given broadcast event 124 is to go live. As illustrated in the legend 175 provided on FIG. 3C, an encoding of '0' indicates that the associated broadcast event 124 is live or already aired; an encoding of '1' indicates that there is less than 1 minute until the broadcast event 124 is to be aired; an encoding of '2' indicates that between 1 and 2 minutes is remaining until the broadcast event 124 is to be aired; an encoding of '5' indicates that there is between 2 and 5 minutes remaining until the broadcast event 124 is to be aired; an encoding of '10' indicates that there is between 5 and 10 minutes remaining until the broadcast event 124 is to be aired; and an encoding of '15' indicates that there is between 10 and 15 minutes remaining until the broadcast event 124 is to be aired.

As illustrated in FIG. 3C, the values in Status 'E' column 358 associated with the first and second broadcast events of FIG. 3A are set to '0' as at the point in time of "20:10:31" shown in FIGS. 3A-3C, both those broadcast events 124 would be either live or have already aired. However, since there is 29 seconds remaining until the third broadcast event 124 of FIG. 3A is scheduled to be aired, the values in the Status 'E' columns 358 associated with the third broadcast event 124 contain a value of '1' to indicate that there is less than 1 minute left until that broadcast event 124 is to air.

Although not illustrated in FIG. 3C, an analogous additional status (e.g., a Status 'F') can be provided which indicates an amount of time after a certain broadcast status has been aired. Such a status may start as '0' if it has not yet been aired and have corresponding increasing categories similar to Status 'E', but for an amount of time after a given broadcast event 124 has aired.

The broadcast statuses 'A' through 'F' discussed above are examples only, and may be modified or combined as is necessary to allow for compatibility with different available content APIs 182 from online content servers 180. For example, in some embodiments, the information in Status 'A' and Status 'C' may be combined together into another status where the different values for the status are named after colors of lights in a traffic signal. For example, a signal may be considered 'red' if a given broadcast event 124 has already aired; 'green' if the broadcast event 124 is currently being broadcasted live; 'yellow' if a broadcast event 124 is next in line to be broadcasted live; and 'unlit' if a broadcast event 124 is pending and not next or live.

It will be understood by persons skilled the art that although various types of data (e.g., encodings, timestamps, binary values) are shown as being potential values within the various broadcast statuses shown in FIG. 3C, such data types are illustrated as examples only. Additional ways of encoding such data into suitable binary formats may be possible in alternate embodiments.

Referring back to FIG. 2, at step 230, the coordination server 140 may, if available, receive an input that indicates whether the broadcast event 124 is being broadcasted live on broadcast television; and insert the information from the input into a signal for that broadcast event 124. As discussed above, in some embodiments, the broadcast module 152 may provide a user interface that allows direct input that overrides the signals that are being generated based on the scheduling information in the coordination index 178. For example, such an embodiment may be desirable in situations where the broadcaster desires to have more granular control of the signals being generated (e.g., if it is desired for online content to coincide with only a portion of the time that a given broadcast event 124 is being aired). Such embodiments may also be desirable in situations where there may not be any begin and end times in the roster file 172 at all, and only an airing order of the broadcast events 124 are provided. This may happen, for example, in situations where the broadcast events 124 are television advertisements for a television program that does not have fixed commercial breaks (e.g., a sporting event). In such case, the input may be received into the coordination server 140 to indicate when a given a broadcast event 124 is being broadcasted live, and the signals may be updated accordingly.

Referring still to FIG. 2, at step 235, the signals generated by the signalling module 158 may be read by the server 140. As noted above, this may be performed in a variety of ways, including the content API 182 being configured to monitor a URL where the signal was provided. The signal may include a content identifier for a given piece of online content 188 (e.g., as shown in column 340 in FIG. 3B), and the content identifier may be used by the online content server 180 to identify the online content 188 at the online content server 180.

At step 240, the online content server 180 may transmit the online content 188 to the computing device 110 for output thereon, in accordance with one or more rules for interpreting the signals read at step 235. In various embodiments, the rules may provide that when a given signal for a broadcast event 124 indicates that the broadcast event 124 is being broadcasted live, the online content server 180 is to transmit the online content 188 to the computing device 110 so that the online content 188 can be displayed synchronously with the live broadcasting of the broadcast event 124. For example, this may be particularly desirable where the broadcast event 124 and online content 188 are both advertisements for the same campaign, so that the messaging of the campaign can be reinforced via simultaneous communication from both the broadcaster and the online advertisement. In some embodiments, the online content 188 may be configured to be interactive and allow input to be received from the user of the computing device 110 while the television advertisement is being aired. In this manner, the interactive online content 188 operating in conjunction with the broadcast event 124 may be considered to be providing a "clickable" television advertisement.

Additionally or alternatively, in some embodiments, the one or more rules may provide that when the signal indicates that a broadcast event 124 is about to be broadcasted, the online content server 180 is to transmit the online content 188 to the computing device 110 so that the online content 188 can be outputted within an amount of time before the broadcast event 124 is broadcasted live. For example, the Status 'E' noted above which provides information about the amount of time until a given broadcast event goes live may be used for this purpose. Moreover, in further embodiments, the one or more rules may provide that when the signal indicates that a broadcast event 124 has recently been broadcasted, the online content server 180 is configured to transmit the online content 188 to the computing device 110 so that the online content 188 can be outputted within an amount of time after the broadcast event was broadcasted live. For example, the Status 'F' noted above which provides information about the amount of time that has elapsed after the event goes live may be used for this purpose.

The coordination of online content 188 to be outputted at the computing device 110 within a period or window of time before and/or after the broadcast event may be desirable to setup or reinforce the message of the broadcast event 124.

Figure 4:
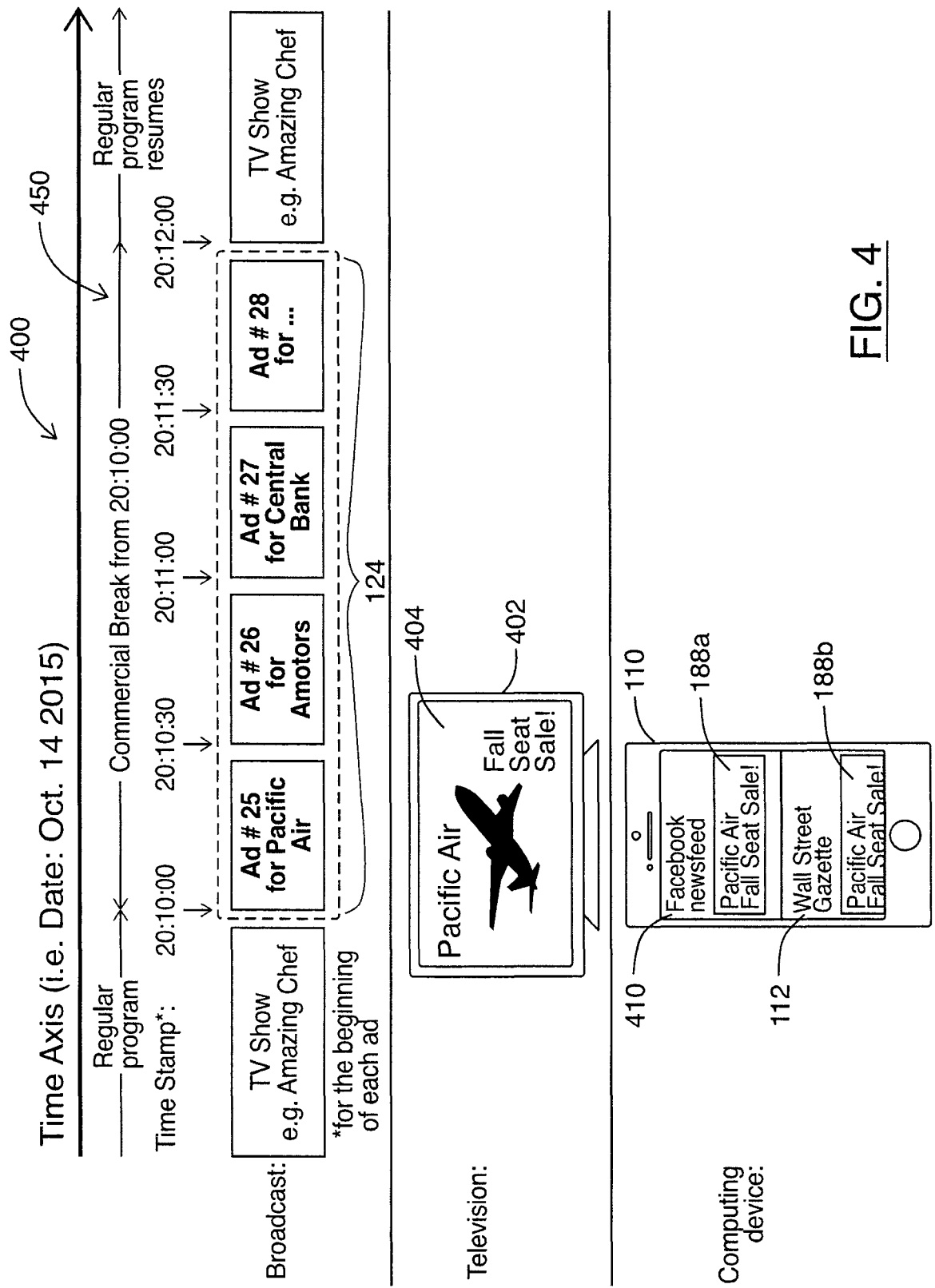
FIG. 4 is an example timeline diagram showing scheduling information for broadcast events that are advertisements, and corresponding example television and computing device displays showing coordinated activity, in accordance with at least one embodiment of the present invention.

Referring to FIG. 4, shown there generally as 400 is an example timeline interface showing scheduling information for broadcast events 124 that are advertisements, and corresponding example television and computing device displays showing coordinated activity, in accordance with at least one embodiment of the present invention. FIG. 4 provides a timeline view of the schedule information of the coordination index 178 shown in FIGS. 3A-3B.

In the top portion of FIG. 4, a view of a timeline is shown where programming and advertisements scheduled to air at particular times are illustrated as rectangular blocks underneath the timeline. There is provided a regularly-scheduled program called the 'Amazing Chef' being broadcasted. In the period from '20:10:00' to '20:12:00', there is a commercial break where four 30-second broadcast events 124 (e.g., television spots) are scheduled to be broadcasted live.

As illustrated, at the time '20:10:00', an advertisement for Pacific Air is to be broadcasted live. This may cause the advertisement 404 to be displayed on television 402. As a result of the embodiments described herein, the computing device 110 may be able to synchronously display an online advertisement 188a from the same ad campaign on a Facebook™ newsfeed (e.g., where Facebook™ acts as the online content server 180). The computing device 110 may also synchronously display another online advertisement 188b from the same ad campaign on a browser 112 displaying a website for a newspaper entitled 'Wall Street Gazette' (e.g., where Google DoubleClick™ acts as the online content server 180 and serves up such online advertisement 188b to the browser 112 visiting the website).

In the embodiments described herein, the coordination of the deployment of the online content 188 with the broadcast event 124 can be achieved with invocation of functionality provided by the content API 182. Notably, this does not require sensors to be activated at the computing device 110 to confirm that the computing device 110 is in the presence of a television that is receiving the broadcast event (e.g., the microphone of a computing device 110 does not first need to be activated to detect audible frequencies that are known to match the sound/audio profile of a known broadcast event, so as cause the computing device 110 to thereafter retrieve the corresponding online content). While the present embodiments may potentially result in situations where a member of the target audience for the coordinated activity may not actually be tuned into the proper channel for the broadcast event 124, or may not be accessing the online content server 180 which is set up to be coordinated with the broadcast event 124 that a viewer is viewing, the present embodiments provide a lightweight solution that does not require: specialized processing to be performed (either remotely on a cloud computing service), specialized hardware/software at the computing device 110, or sensors of the computing device 110 to be activated (excessive use of which may cause battery drain on the computing device 110). If the agency selects popular broadcast events (e.g., television shows with high viewership), as well as popular online content platforms, then the present embodiments may allow coordinated reach of a large audience.

Example User Interfaces Provided by the Coordination Server

Figure 5:
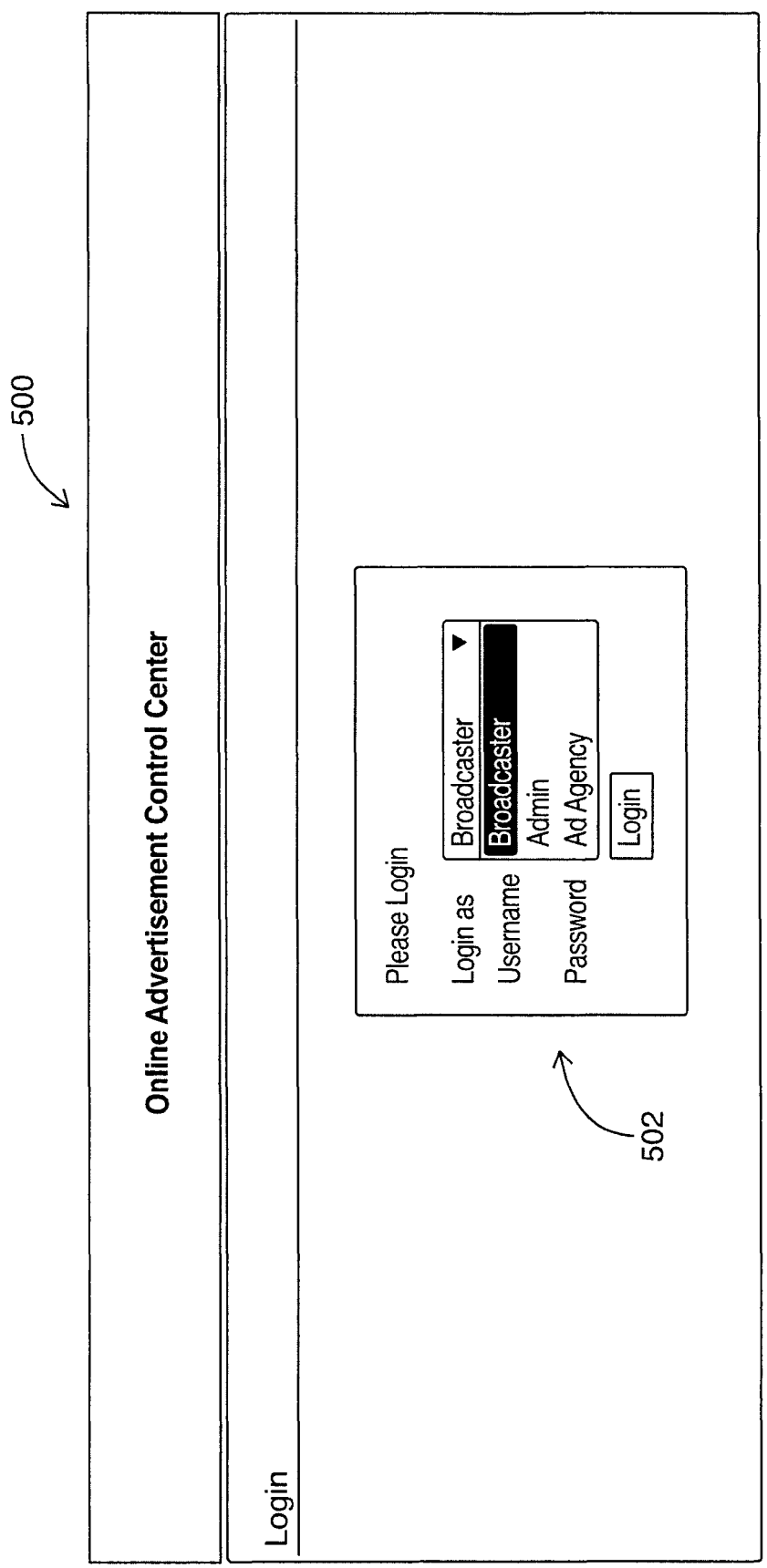
FIG. 5 is an example user interface showing a login screen as may be presented by a coordination server, in accordance with at least one embodiment of the present invention.

FIGS. 5-8 illustrate some example user interfaces that may be provided by the coordination server 140. Referring first to FIG. 5, shown there generally as 500 is an example user interface with a login screen as may be presented by a coordination server 140, in accordance with at least one embodiment of the present invention. The illustrated example may allow three types of users to log in: a broadcaster, an ad agency, and an administrator user. In the login screen, a user interface control 502 may be provided to allow selection of the type of user logging in.

Figure 6A:
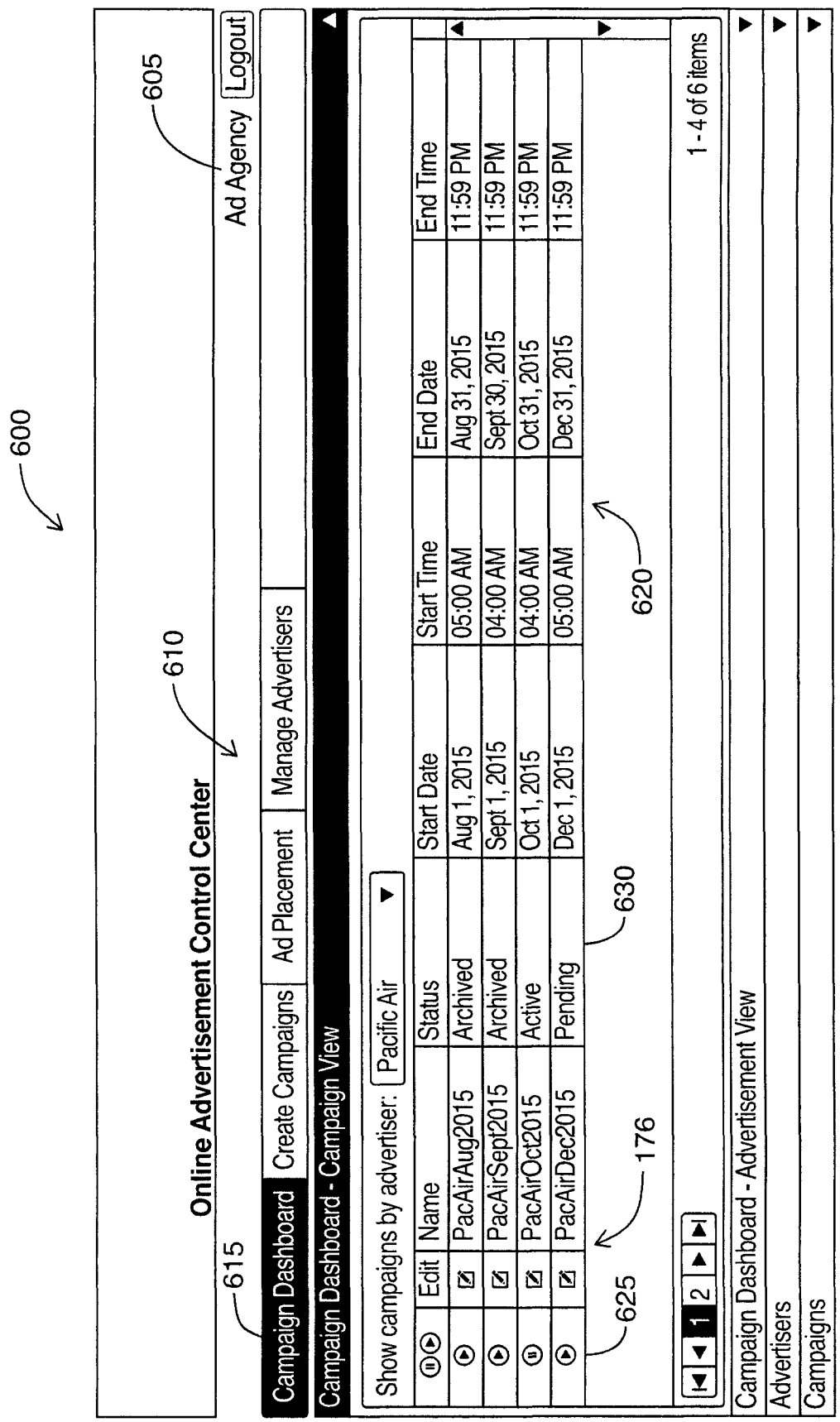

FIGS. 6A 6D are example user interfaces of an 'ad agency' view that may be presented by a coordination server 140, in accordance with at least one embodiment of the present invention. In various embodiments, these user interfaces may be presented by the agency module 156 of the coordination server 140 when accessed by an agency device 130 (as shown in FIG. 1).

Referring to FIG. 6A, shown there generally as 600 is the example 'ad agency' 605 view. The example user interface may have various tabs 610 that provide different options for functionality related to: 'Campaign Dashboard', 'Create Campaigns', 'Ad Placement', and 'Manage Advertisers'. As illustrated in FIG. 6A, the 'Campaign Dashboard' 615 tab is selected and the user interface has opened that view for display. In the open view, users may select to view different campaigns by a given advertiser and listing of campaign information 176 for the selected advertiser may be displayed. The displayed campaigns may have start and end times 620, an archived/active/pending status 630, and a user interface control 625 that allows the ad agency to select whether they want to start/resume or pause/stop a given campaign.

Figure 6B:
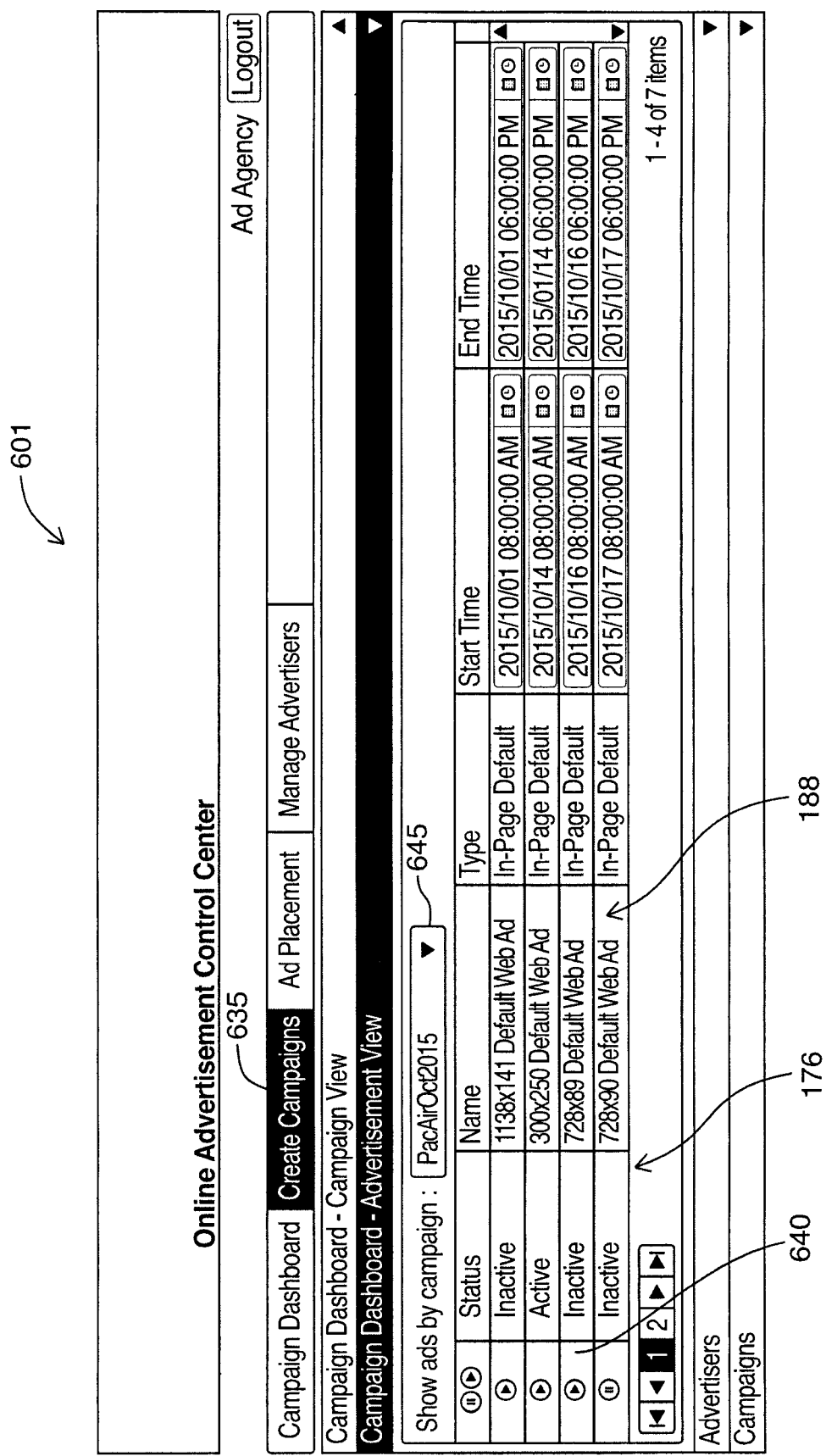

Referring to FIG. 6B, shown there generally as 601 is a further view of the 'ad agency' view, except here, the 'Create Campaigns' 635 tab has been selected, and the 'Advertisement View' view is available for display. As shown, there is a user interface control 645 that allows for the viewing of ads by campaign. The displayed window also provides information about various campaign information 176 and the online content 188 (e.g., online advertisements) associated therewith. This 'Advertisement View' similarly has user interface controls 640 for actively indicating whether these ads are to be started or stopped to allow the ad agency to indicate whether they would like a particular ad to be made available for linking with associated broadcast events 124 (e.g., for the purpose of the creation of a coordination index 178, as discussed above).

Figure 6C:
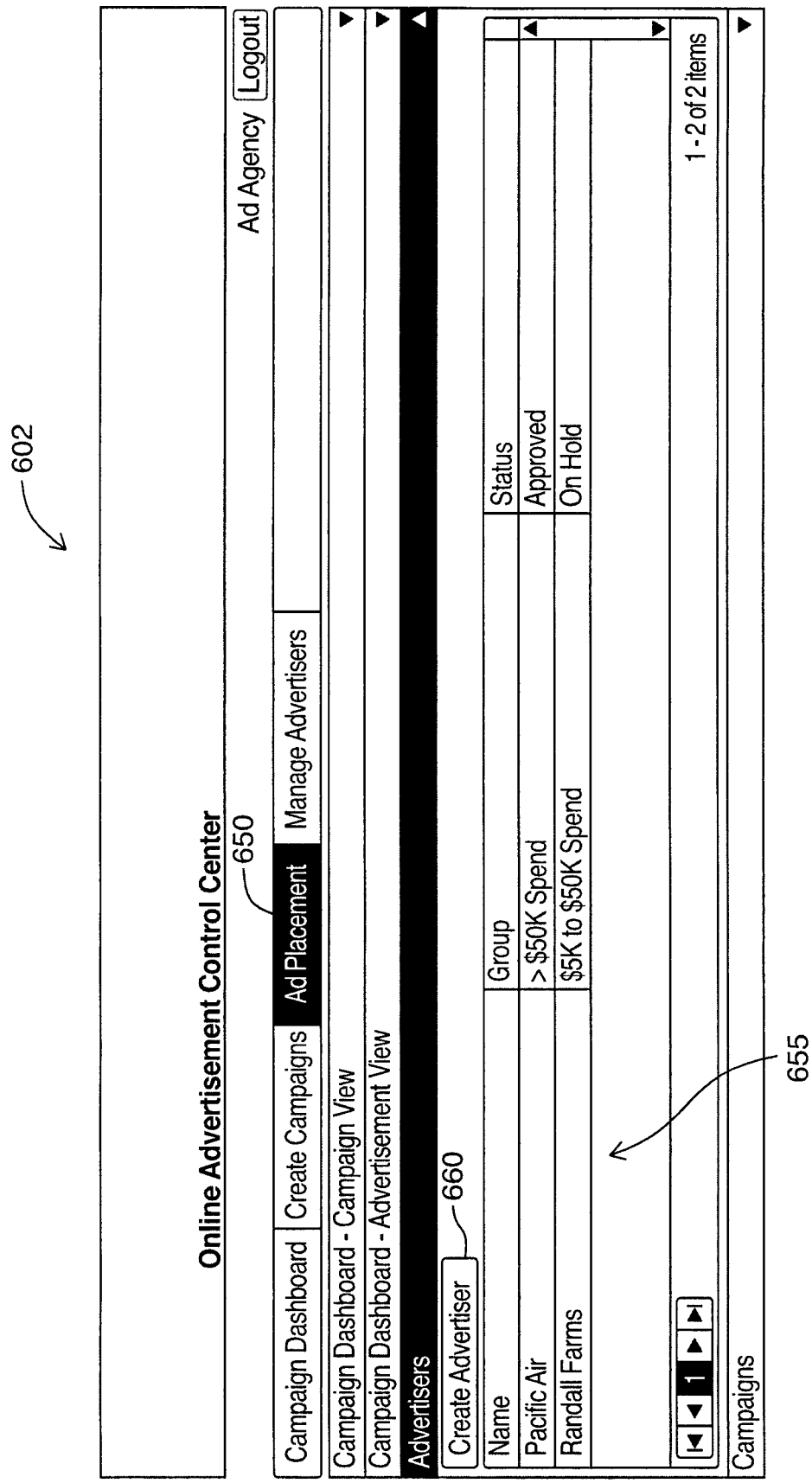

Referring to FIG. 6C, shown there generally as 602 is still a further view of the 'ad agency' view, except here, the 'Ad Placement' 650 tab has been selected, and the 'Advertisers' view is available for display. This view may allow ad agencies to add advertisers that are their clients via a user interface control 660. Once added, various added advertisers 655 and their associated information may be displayed.

Referring to FIG. 6D, shown there generally as 603 is another view of the 'ad agency' view, except here, the 'Manage Advertisers' 670 tab has been selected, and the 'Campaigns' view is available for display. This view may allow ad agencies to create campaigns via a user interface control 675. The created campaigns 176 may then have their information displayed once created.

FIGS. 7A-7D are example user interfaces of a 'broadcaster' view that may be presented by a coordination server 140, in accordance with at least one embodiment of the present invention. In various embodiments, these user interfaces may be presented by the broadcaster module 152 of the coordination server 140 when accessed by a broadcaster device 120 (as shown in FIG. 1).

Figure 7A:
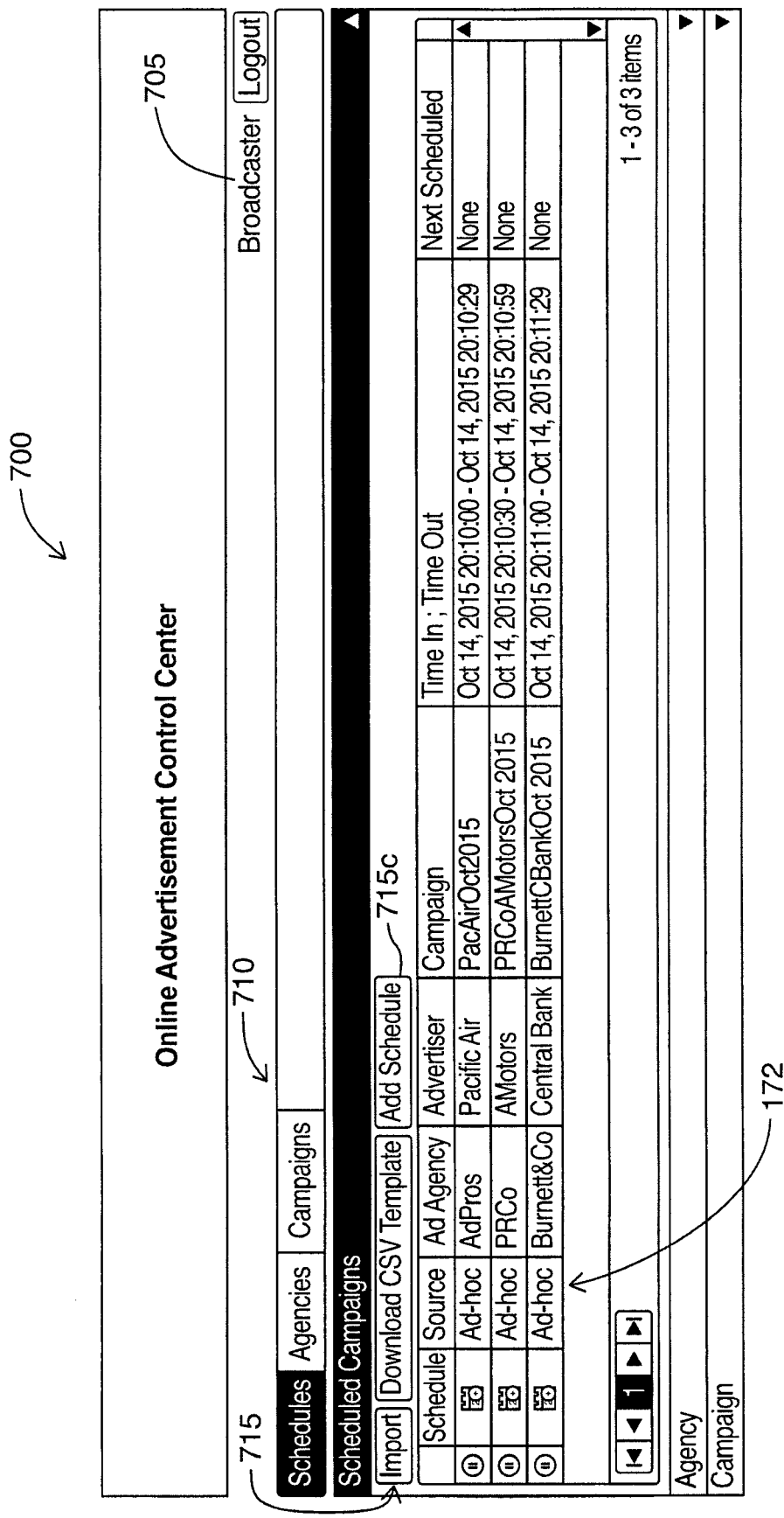
FIGS. 7A-7D are example user interfaces of a 'broadcaster' view that may be presented by a coordination server, in accordance with at least one embodiment of the present invention.

Referring to FIG. 7A, shown there generally as 700 is an example 'broadcaster' 705 view. The example user interface may have various tabs 710 that provide different options for 'Schedules', 'Agencies', and 'Campaigns'. As illustrated in FIG. 7A, the 'Schedules' tab is selected and the user interface has opened the 'Scheduled Campaigns' view for display. In the open view, users may have various buttons 715 available to be selected for creating a roster file 172 for storage on roster file database 162 (as shown in FIG. 1). For example, there may be options to import a roster file 172, download a Common-Separated Values (CSV) template version of the file or a button 715*c* to manually add information for the roster file 172. Once added, various types of information related to the roster files 172 can be displayed. If the button 715*c* to manually add a schedule is selected, the user interface of FIG. 7B may be displayed.

Figure 7B:
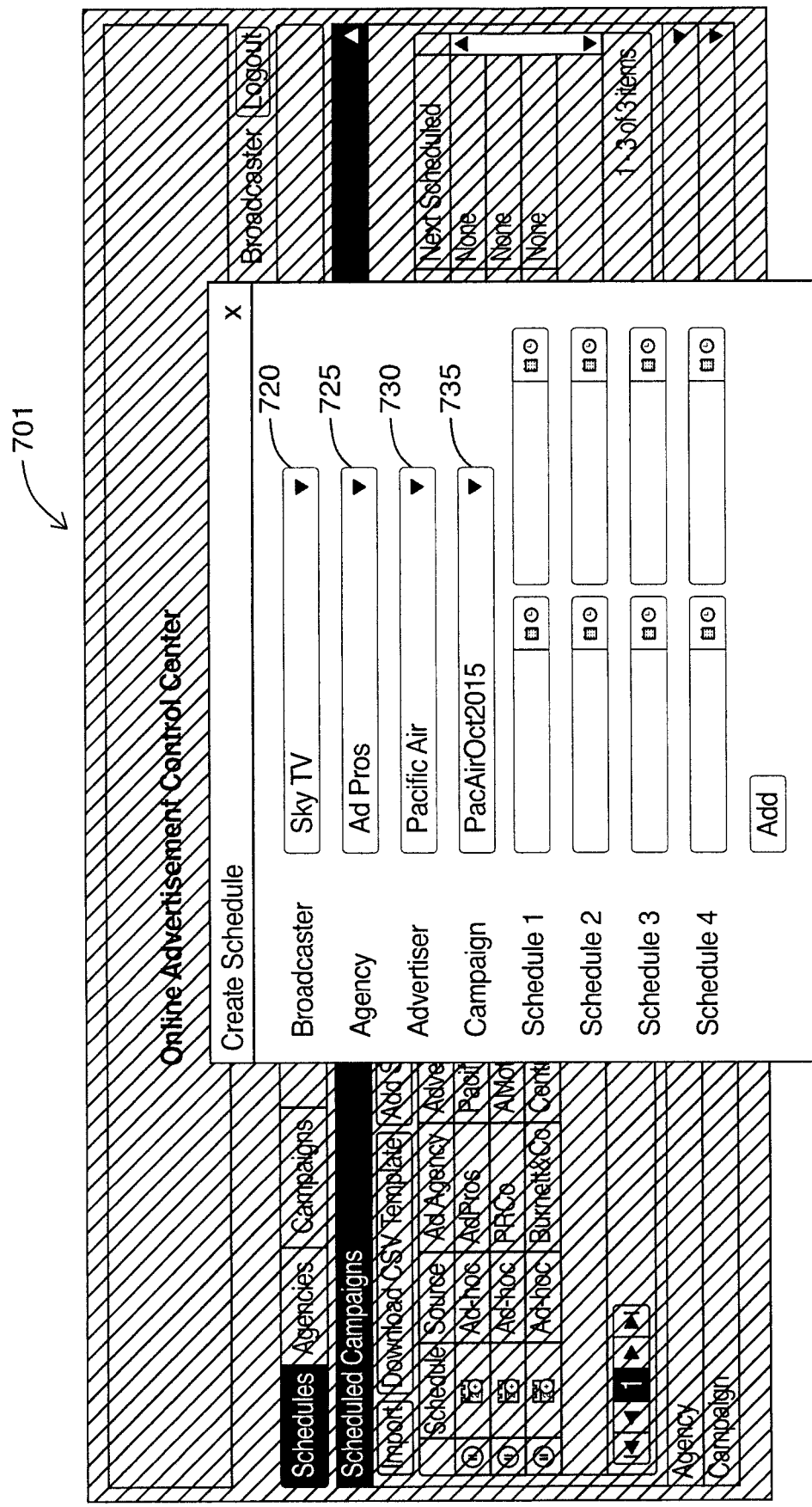

Referring to FIG. 7B, shown there generally as 701 is a popup 750 that may be shown when a user manually enters schedule information for a roster file 172. As shown, there may be user interface controls for selecting the broadcaster 720, the agency 725 associated with campaign being entered, the advertiser 730 of a product being marketed, and a particular campaign 735. Controls for adding the date/times the campaign (and associated broadcast advertisements) are to be run may also be entered.

Figure 7C:
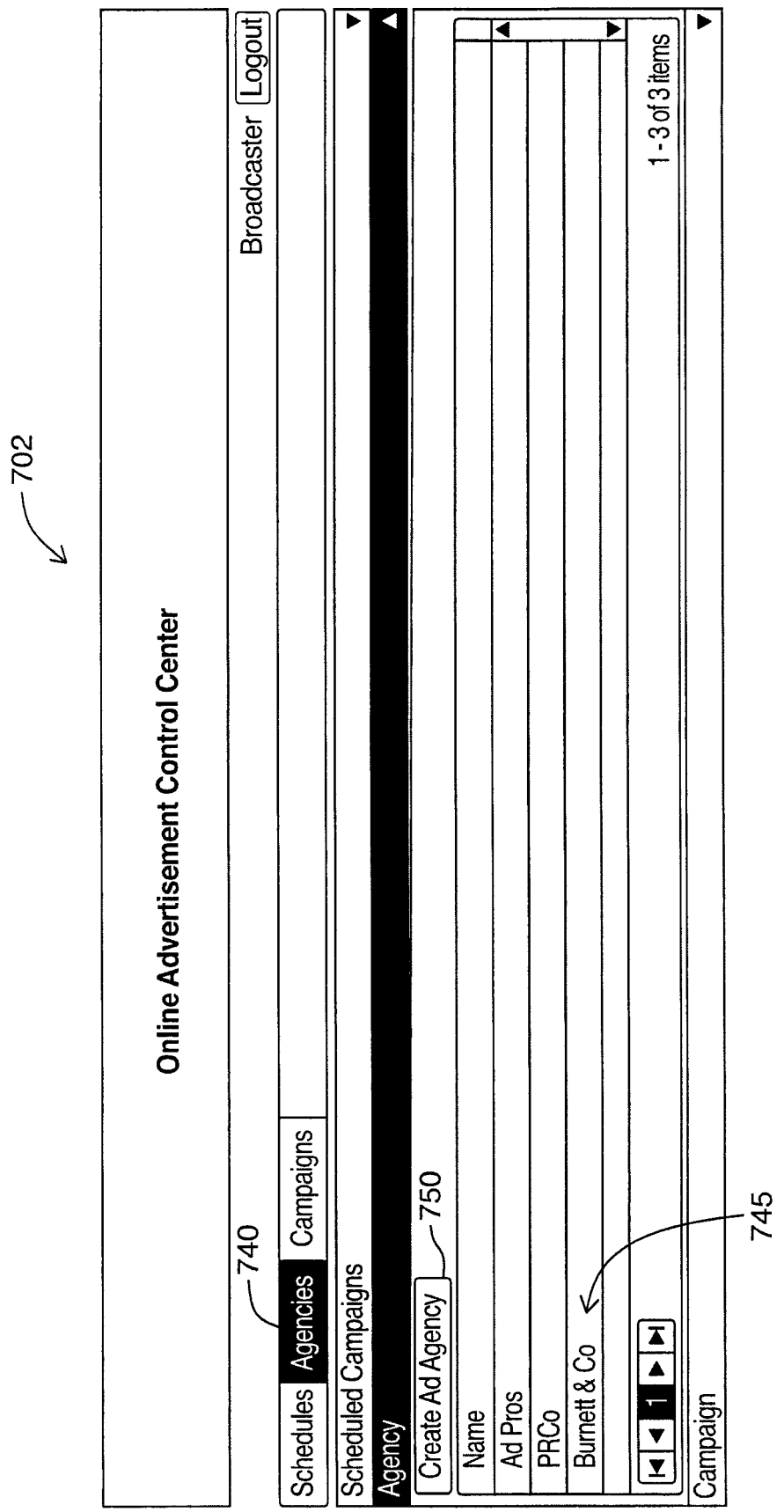

Referring to FIG. 7C, shown there generally as 702 is another screenshot of the 'broadcaster' view, except here, the 'Agencies' 740 tab has been selected, and the 'Agency' view is available for display. This view may allow personnel at a broadcaster to add agencies that are clients of the broadcaster via a user interface control 750. Once added, various added agencies 745 and their associated information may be displayed.

Figure 7D:
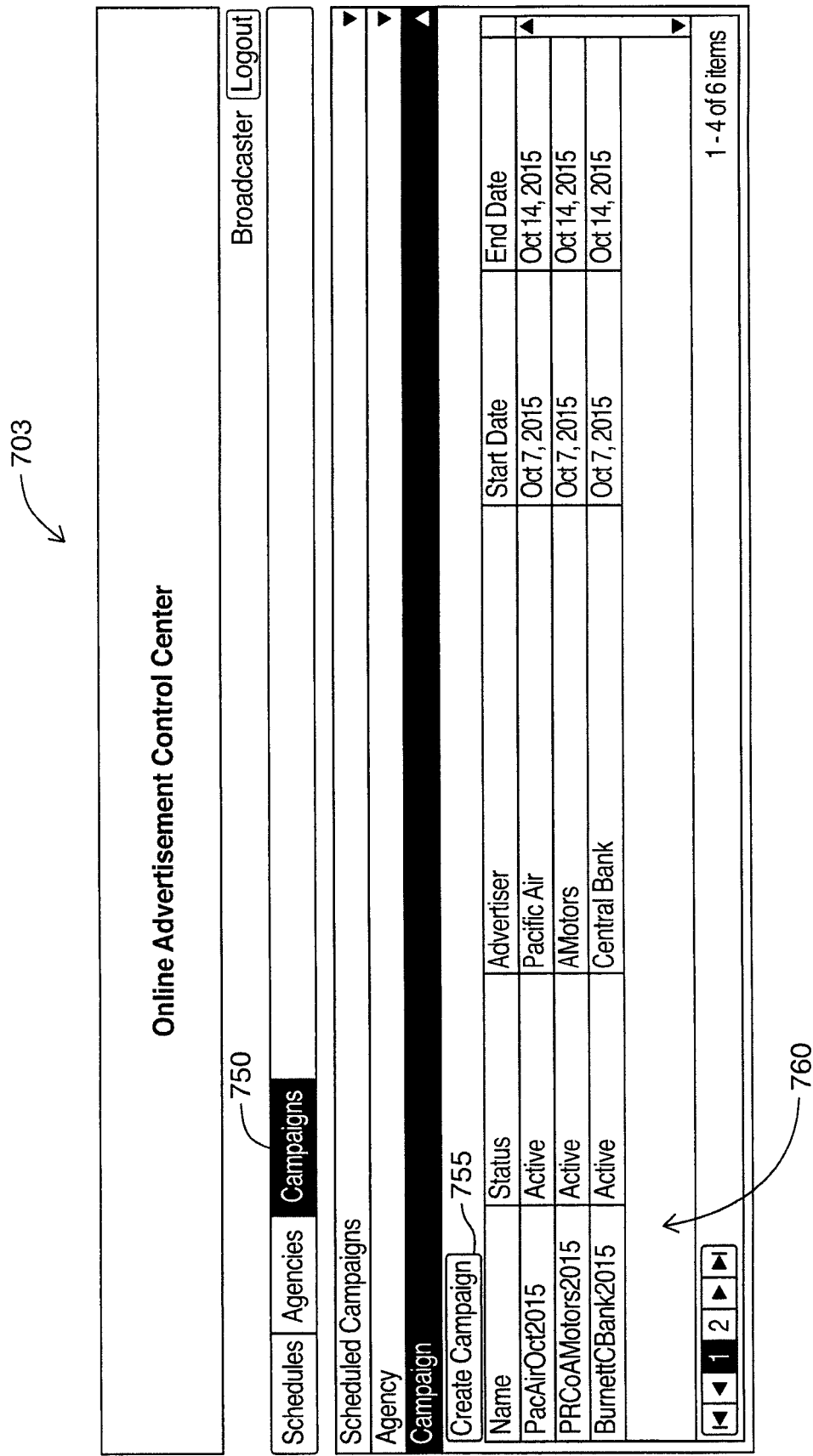

Referring to FIG. 7D, shown there generally as 703 is another view of the 'broadcaster' view, except here, the 'Campaigns' 750 tab has been selected, and the 'Campaign' view is available for display. This view may allow broadcasters to create campaigns via a user interface control 755. The created campaigns 760 may then have their information displayed once created. Additional user interface controls (not shown) may also be provided that allow broadcasters to associate the created campaigns with broadcast events in a roster file 172. In doing so, common campaign identifiers as entered by the broadcaster and ad agency may be located and merged on by the index generation module 154 (as shown in FIG. 1), when generating a coordination index 178.

Figure 8:
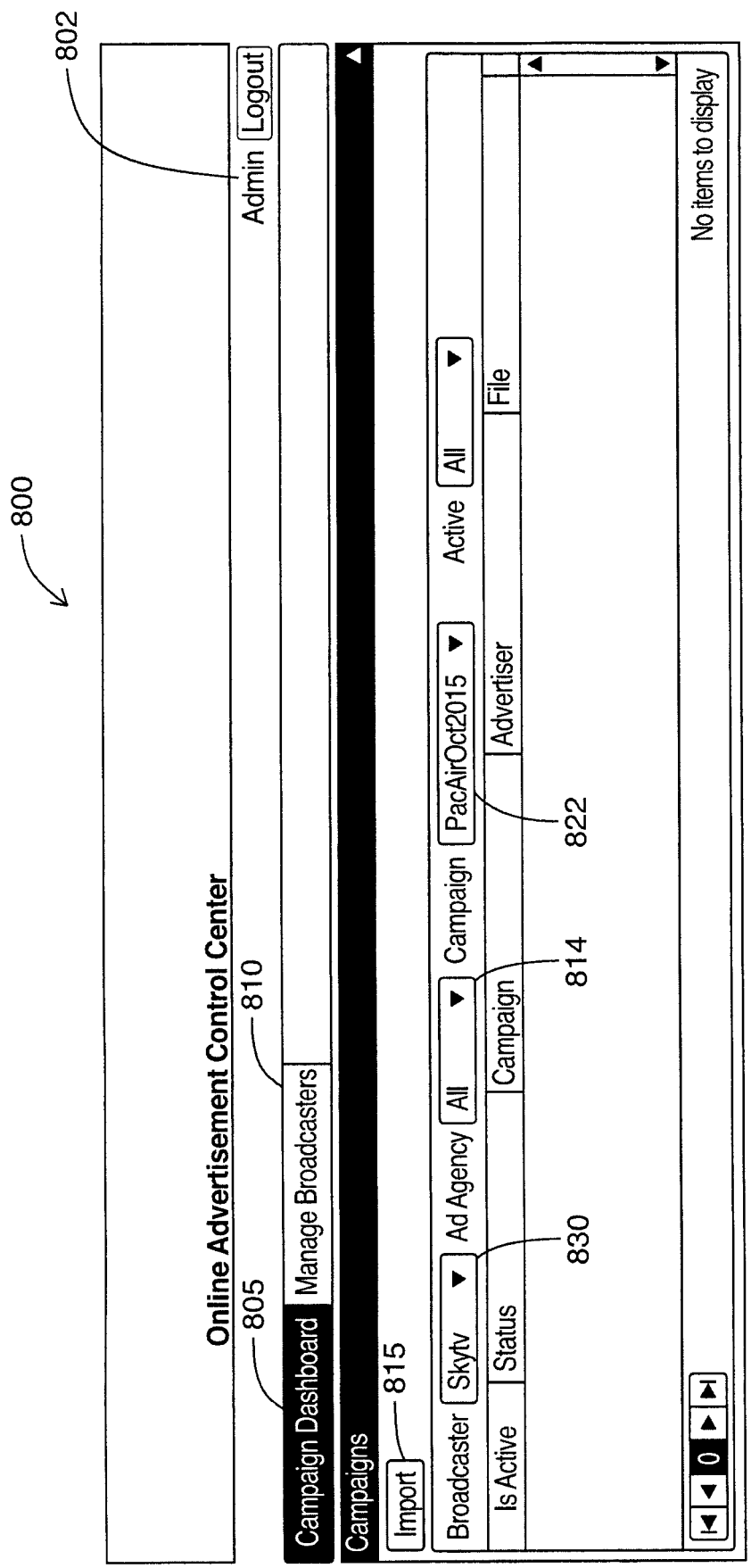
FIG. 8 is an example user interface of an 'administrator' view that may be presented by a coordination server, in accordance with at least one embodiment of the present invention.

Referring to FIG. 8, shown there generally as 800 is an example user interface of an 'administrator' view 802 that may be presented by a coordination server 140, in accordance with at least one embodiment of the present invention. The example user interface may have various tabs 805, 810 that provide different options for 'Campaign Dashboard' and 'Manage Broadcasters' respectively. As illustrated in FIG. 8, the 'Campaign Dashboard' tab 805 is selected and the user interface has opened the 'Campaigns' view for display. The user interface may provide a user interface control 815 that allows for the importation/uploading of a coordination index 178 which already has merged information for a given campaign with both scheduling information from a roster file 172 and online content campaign information 176. Once imported, this information may be viewable in the user interface and the user interface may provide user interface controls for viewing/sorting by broadcaster 830, ad agency, 814, and/or campaign 822.

Overview of Some Additional Embodiments

Figure 9:
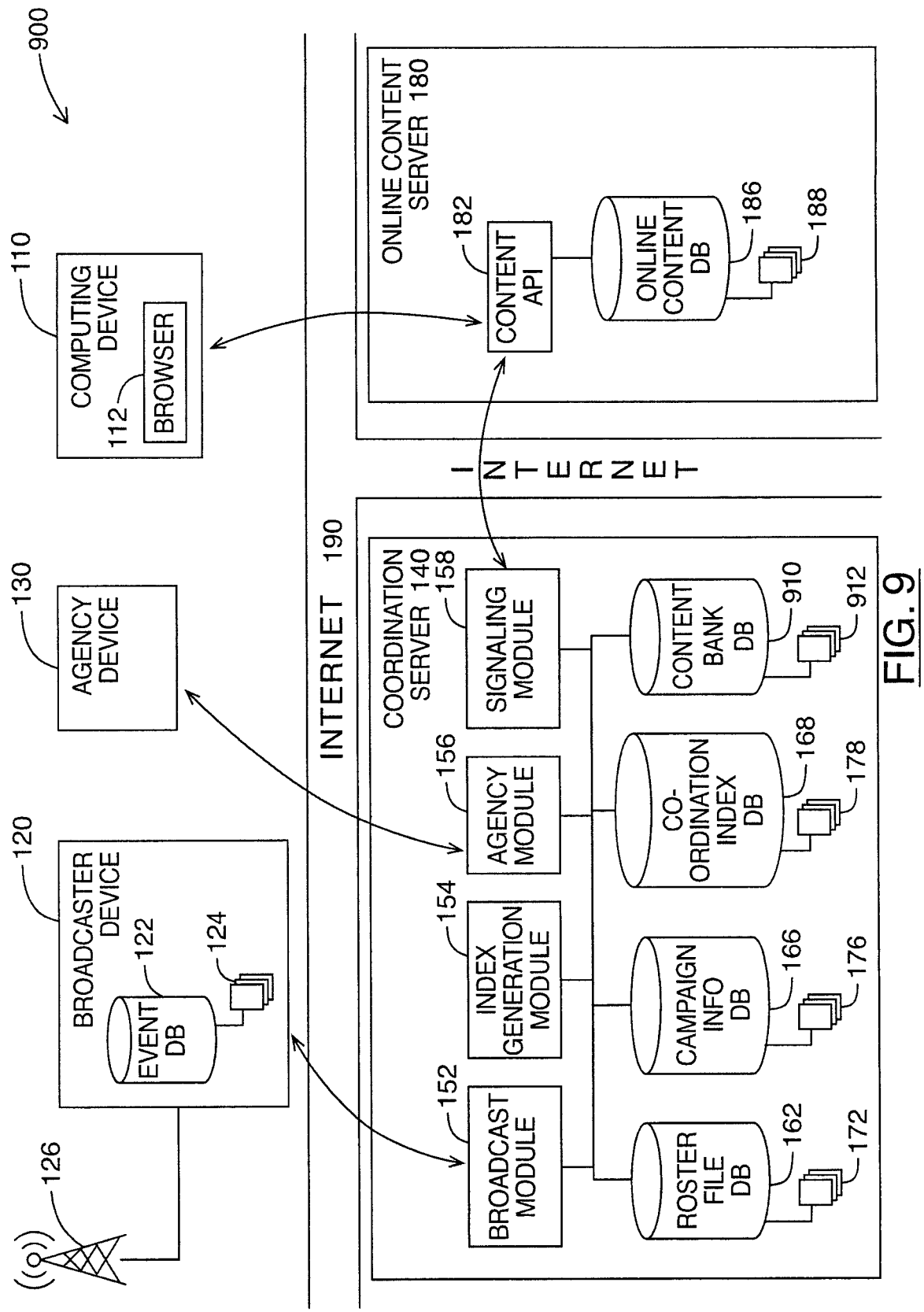
FIG. 9 is a block diagram of a system for coordinating online activity, in accordance with at least one embodiment of the present invention.

Referring to FIG. 9, shown there generally as 900 is a block diagram of a variation of the system of FIG. 1, in accordance with some embodiments of the present disclosure. Differing from the system of FIG. 1, in the system of FIG. 9 coordination server 140 is configured to have a content bank database 910 for storing content items 912. Content items 912 represent content that may be communicated by signaling module 158 to online content server 180 for transmission to the computing device 110 according to one or more rules for communicating content items 912.

In some example embodiments, the online content server 180 is a server operated by Twitter™, and content bank database 910 is configured to store inactive content items 912 for future activation and communication to the online content server 180. Content items 912 may consist of standard tweets (i.e., ordinary messages for posting to the Twitter™ service), promoted tweets (i.e., messages for posting to the Twitter™ service by advertisers that the Twitter™ service will promote to a wider group of users than standard tweets), Twitter™ advertisements, Twitter™ cards (i.e., messages with attached photos, videos, and/or other multimedia elements), and/or other content types that may be supported to the Twitter™ service. Like the pieces of online content 188 stored in online content database 186 in some embodiments described earlier, each content item 912 may be stored with an associated content identifier which is to be used to identify the content item 912. In some embodiments, each content item 912 may be stored with other information, for example information mandated by the Twitter™ service for use when posting the content item.

In some embodiments, coordination server 140 provides a web page interface allowing a user of agency device 130 or another Internet-enabled computer to create and save content items 912 in content bank database 910. In some embodiments, a mobile device application may be provided to create content items that are subsequently uploaded into content bank database 910.

Figures 10A, 10B:
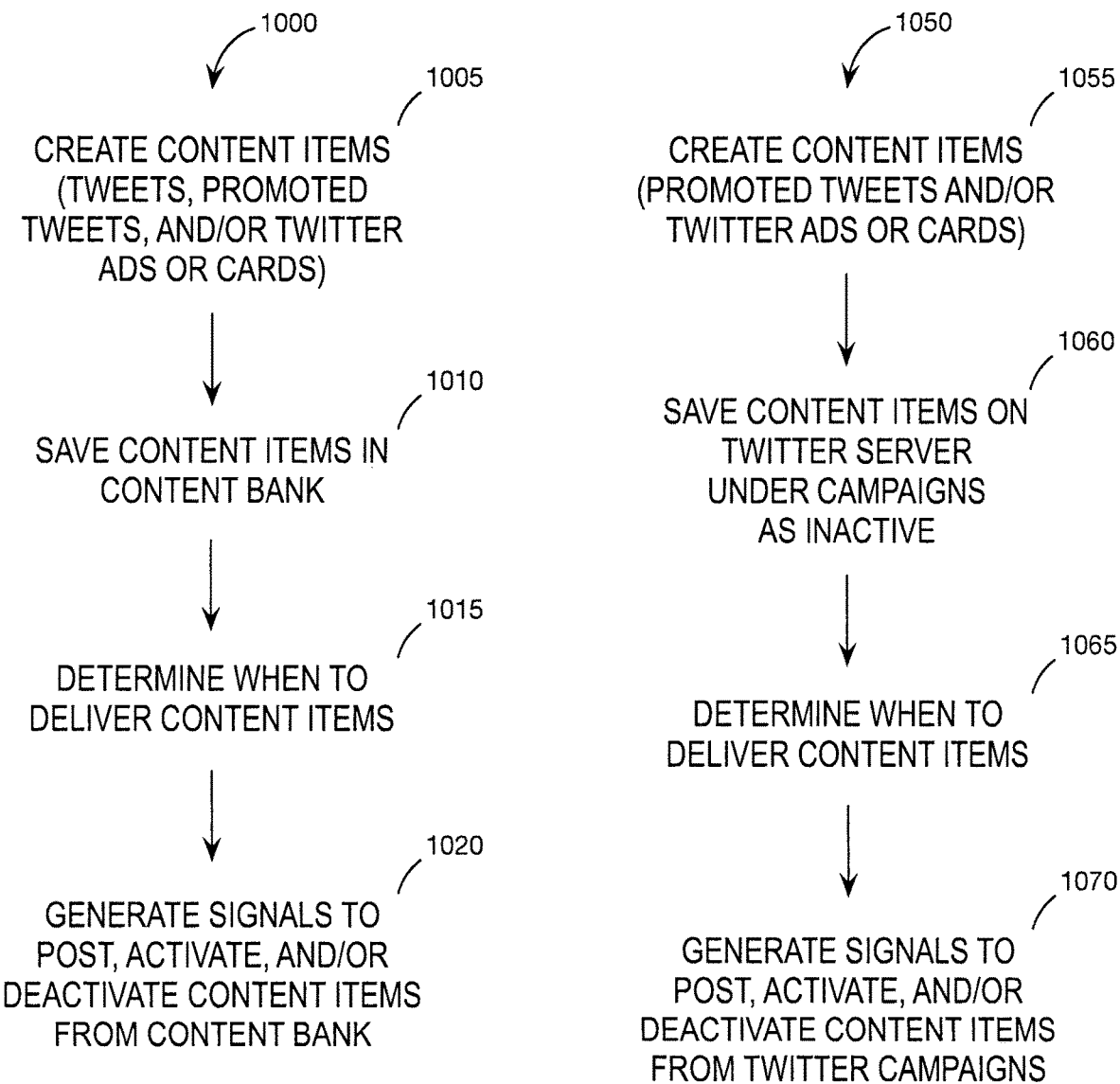
FIGS. 10A-10B are flow diagrams illustrating steps performed during methods of coordinating online activity using Twitter™, in accordance with some embodiments of the present invention.

Referring to FIG. 10A, shown there generally as 1000 is a flow diagram illustrating steps performed during a method of coordinating online activity using Twitter™. In describing the steps of FIG. 10A, reference will simultaneously be made to the various components shown in FIG. 9 and to descriptions of other embodiments earlier in this specification. At step 1005, content items 912 consisting of standard tweets, promoted tweets, Twitter™ advertisements, Twitter™ cards, and/or other content types that may be supported to the Twitter™ service are created, for example using a web page interface of coordination server 140. At step 1010, the created content items 912 are stored in an inactive state in the content bank database 910 for future use.

At step 1015, a determination is made regarding when to deliver one or more of the content items 912 to online content server 180 operated by Twitter™ for posting. In some embodiments, this determination may be based on a manual or ad-hoc start or stop instruction received by coordination server 140. In some embodiments, this determination may be based on a determination by the index generation module 154 that one or more of the content items 912 should be posted based on information in roster file database 162, as described earlier in this specification. For example, the determination may be made using an automated schedule feed such as a TV broadcaster's advertisement line-up to coordinate posting of the content items 912 with broadcast events. In some embodiments, the determination may be based on a schedule file of times for posting particular content items that has been provided to coordination server 140, or a list of rules for posting particular content items that has been provided to coordination server 140. In some embodiments, the determination results in generation or updating of coordination indices 178 for storage into the coordination index database 168, as described earlier in this specification. It should be understood that a determination may be made to post certain content types supported to the Twitter™ service, such as standard tweets, without making a corresponding determination regarding a time to deactivate the posted content. For example, in some embodiments, standard Tweets may be posted and may never expire or be removed.

At step 1020, signaling module 158 of coordination server 140 generates signals to cause online content server 180 operated by Twitter™ to post, make active, or make inactive content items 912 at times previously determined in step 1015. In some embodiments, the signals are invocations of the Twitter™ API. In some embodiments, the signals may include interactions with the Campaigns API of the Twitter™ service to cause certain content items 912 to be stored on the online content server 180 prior to being activated and/or inactivated as online Twitter™ content.

In some embodiments, coordination server 140 may omit or not always make use of content bank database 910 for storing content items 912. In such embodiments, some content items such as promoted tweets, Twitter™ advertisements, Twitter™ cards, and/or other content types that may be supported to the Twitter™ service are created directly using the Campaigns feature of the Twitter™ service and saved as inactive online content 188 in online content database 186. In other embodiments, some inactive content items 912 are stored in content bank database 910 and other inactive online content 188 is stored in online content database 186.

Referring to FIG. 10B, shown there generally as 1050 is a flow diagram illustrating steps performed during a method of coordinating online activity using Twitter™ that is a variation of the method of FIG. 10A. At step 1055, content items consisting of promoted tweets, Twitter™ advertisements, Twitter™ cards, and/or other content types that may be supported to the Twitter™ service are created through an interface to the Campaigns feature of online content server 180 operated by Twitter™, for example using a web page interface of online content server 180, a mobile application provided by Twitter™, or an API to the Campaigns feature provided by online content server 180. At step 1060, the content items are stored in an inactive state on online content database 186 of the online content server 180 operated by Twitter™ for future use.

At step 1065, a determination is made regarding when to cause one or more of the content items stored on the online content server 180 operated by Twitter™ to be activated for posting. In some embodiments, the determination may be made by coordination server 140, and in other embodiments, the determination may be made at least in part by online content server 180. In some embodiments, this determination may be based on factors discussed above with respect to step 1015. In some embodiments, this determination may also be based on campaign start and end dates and times specified for Twitter™ advertisements and/or promoted tweets. In some embodiments, this determination may also be based on individual start and end date parameters associated with the content items.

At step 1070, signaling module 158 of coordination server 140 generates signals to cause online content server 180 operated by Twitter™ to post, make active, or make inactive content items at times previously determined in step 1065. In some embodiments, the signals are invocations of the Twitter™ API.

It should be understood that method 1000 of FIG. 10A and method 1050 of FIG. 10B may be varied in some embodiments, and may for example include additional steps not illustrated in FIGS. 10A and 10B. In particular, steps of methods described earlier in this specification, for example the steps of the method illustrated in FIG. 2, may be combined with, or substituted for, particular method steps illustrated in FIGS. 10A and 10B.

Additional Information Regarding the Disclosure

While the foregoing disclosure has been described in some detail for purposes of clarity and understanding, such disclosure is provided by way of example only. It will be appreciated by one skilled in the art, from a reading of the disclosure that various changes in form and detail of these exemplary embodiments can be made without departing from the true scope of the disclosure, which is limited only by the appended claims. For example, it should be understood that acts and the order of the acts performed in the processing described herein may be altered, modified and/or augmented (whether or not such steps are described in the claims, figures or otherwise in any sequential numbered or lettered manner) yet still achieve the desired outcome. While processes or blocks are presented in a given order, alternative examples may perform routines having steps, or employ systems having blocks, in a different order, and some processes or blocks may be deleted, moved, added, subdivided, combined, and/or modified to provide alternatives or subcombinations. Each of these processes or blocks may be implemented in a variety of different ways. Also, while processes or blocks are at times shown as being performed in series, these processes or blocks may instead be performed in parallel, or may be performed at different times.

In the systems illustrated in the figures, it will be understood that although a specific number of system elements may be shown, this manner of illustration is intended for purposes of schematic illustration only and is not meant to be limiting. More or fewer elements than illustrated may be possible. As one example, although roster files 172 are illustrated in FIG. 1 using a symbol with three overlapping rectangles, it should be understood that any number of roster files 172 may be stored in roster file database 162.

In the various user interfaces illustrated in the figures, it will be understood that the illustrated user interface text and controls are provided as examples only and are not meant to be limiting with regards to their appearance. Other suitable ways of arranging and modifying the appearance of user interface elements may be possible.

Those skilled in the relevant art will appreciate that aspects of the system can be practised with other communications, data processing, or computer system configurations, including: Internet appliances, cloud computing, multi-processor systems, microprocessor-based or programmable devices, network PCs, mini-computers, mainframe computers, and the like.

Software and other modules may be accessible via local memory, via a network, via a browser or other application in an Application Service Provider (ASP) context, or via other means suitable for the purposes described herein. Examples of the technology can also be practised in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures (e.g., containers) described herein may include computer files, variables, programming arrays, programming structures, or any electronic information storage schemes or methods, or any combinations thereof, suitable for the purposes described herein.

Where a component (e.g. a model, processor, scheduler, display, data store, software module, assembly, device, circuit, etc.) is referred to above, unless otherwise indicated, reference to that component should be interpreted as including as equivalents of that component any component which performs the function of the described component (i.e., that is functionally equivalent), including components which are not structurally equivalent to the disclosed structure which performs the function in the illustrated exemplary embodiments of the invention.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

What is claimed is:

1. A method of coordinating the display of online content with a broadcast event on broadcast television, the online content being stored on a content server, the method comprising the steps of:
    reading a coordination index, the coordination index comprising:
    an identifier for the online content, the online content being transmittable to a computing device for output on the computing device, and
    scheduling information of the broadcast event to be broadcasted on broadcast television, the scheduling information indicating a broadcast status of the broadcast event during at least one of a time period preceding the broadcast event being broadcasted, contemporaneous with the broadcast event being broadcasted and succeeding the broadcast event being broadcasted, wherein the broadcast status is one of a set of predefined broadcast statuses;
    wherein the coordination index associates the scheduling information of the broadcast event to be broadcasted on broadcast television with the identifier for the online content;
    generating a signal for reading by the content server to indicate a current broadcast status of the broadcast event together with the associated identifier for the online content, the current broadcast status being one of the predefined broadcast statuses;
    updating, as time proceeds, the generated signal for reading by the content server to reflect a change of the current broadcast status of the broadcast event from a first broadcast status to a second broadcast status;
    wherein, upon the generated signal being read by the content server, the content server transmits the online content associated with the identifier indicated by the generated signal to the computing device in accordance with the broadcast status indicated by the generated signal.

2. The method of claim 1, wherein the scheduling information comprises a scheduled begin time for when the broadcast event is to be broadcasted on broadcast television.

3. The method of claim 2, wherein prior to the scheduled begin time, the generated signal indicates, as the current broadcast status, that the broadcast event is about to be broadcasted.

4. The method of claim 3, wherein at the scheduled begin time, the generated signal is updated to indicate that the broadcast event is being broadcasted live.

5. The method of claim 4, wherein the scheduling information comprises a scheduled end time for when the broadcast event is to cease being broadcasted on broadcast television, and at the scheduled end time, the generated signal is updated to cease indicating that the broadcast event is being broadcasted live.

6. The method of claim 5, wherein, for a predetermined period after the scheduled end time, the generated signal is updated to indicate that the broadcast event has recently been broadcasted.

7. The method of claim 1, wherein the coordination index comprises additional scheduling information of additional broadcast events to be broadcasted on broadcast television, and wherein the scheduling information and the additional scheduling information comprises sequence information for an airing order of the broadcast event and the additional broadcast events, without including schedule begin times for the broadcast event and the additional broadcast events.

8. The method of claim 7, wherein the coordination index comprises additional scheduling information of the additional broadcast events to be broadcasted on broadcast television, and the content server stores additional online content, the method further comprising:
based on the coordination index, generating additional signals to indicate respective broadcast statuses of the additional broadcast events;
wherein, upon the additional generated signals being read by the content server, the content server transmits the additional online content to the computing device in accordance with one or more rules for interpreting the generated signal by the content server.

9. The method of claim 8, wherein the additional scheduling information for one of the additional broadcast events indicates that one of the additional broadcast events is to be broadcasted on broadcast television during a time period immediately preceding the broadcast event, and during the time period, the generated signal for the broadcast event is updated to indicate that the broadcast event is to be broadcasted next.

10. The method of claim 9, further comprising:
receiving an input that indicates whether the broadcast event is being broadcasted live on broadcast television; and
inserting the information from the input into the generated signal.

11. The method of claim 1, wherein one or more rules for interpreting the generated signal by the content server provide that when the current broadcast status indicated by the generated signal indicates the broadcast event is being broadcasted live, the content server is configured to transmit the online content to the computing device so that the online content can be displayed synchronously.

12. The method of claim 11, wherein the one or more rules for interpreting the generated signal by the content server provide that when the current broadcast status indicated by the generated signal indicates that the broadcast event has recently been broadcasted, the content server is configured to transmit the online content to the computing device so that the online content can be outputted within an amount of time after the broadcast event was broadcasted live.

13. The method of claim 12, wherein the one or more rules for interpreting the generated signal by the content server provide that when the current broadcast status indicated by the generated signal indicates that the broadcast event is about to be broadcasted, the content server is configured to transmit the online content to the computing device so that the online content can be outputted within an amount of time before the broadcast event is broadcasted live.

14. The method of claim 13, wherein the amount of time is selected from the group consisting of: 15 seconds, 30 seconds, 1 minute, 2 minutes, 5 minutes, 10 minutes, 15 minutes, 30 minutes, and 1 hour.

15. The method of claim 14, wherein the generated signal comprises a timestamp for when the generated signal began to indicate that the broadcast event is being broadcasted live.

16. The method of claim 15, wherein the broadcast event comprises a television advertisement.

17. The method of claim 16, wherein the online content comprises an online advertisement to be displayed within a browser application executing on the computing device.

18. The method of claim 17, wherein the content server comprises an online advertisement service server configured to read the generated signal as an input for triggering when the online advertisement is to be served for display within the browser application.

19. The method of claim 18, wherein prior to the reading of the coordination index, the method further comprises generating the coordination index by:
loading campaign information comprising the identifier for the online content and a first campaign identifier associated with the online content;
loading a roster file comprising the scheduling information of the broadcast event and a second campaign identifier associated with the broadcast event; and
merging the roster file with the campaign information by associating the scheduling information of the broadcast event with the identifier for the online content when the first campaign identifier matches the second campaign identifier.

20. The method of claim 19, wherein the associated identifier for the online content indicated by the generated signal is used by the server to identify the online content at the server prior to transmitting the online content to the computing device.

21. A coordination server comprising a processor and a memory for storing instructions to coordinate the display of online content with a broadcast event on broadcast television, the online content being stored on a content server, wherein when the instructions are executed by the processor, the processor:
reads a coordination index, the coordination index comprising:
an identifier for the online content, the online content being transmittable to a computing device for output on the computing device, and
scheduling information of the broadcast event to be broadcasted on broadcast television, the scheduling information indicating a broadcast status of the broadcast event during at least one of a time period preceding the broadcast event being broadcasted, contemporaneous with the broadcast event being broadcasted and succeeding the broadcast event being broadcasted, wherein the broadcast status is one of a set of predefined broadcast statuses,
wherein the coordination index associates the scheduling information of the broadcast event to be broadcasted on broadcast television with the identifier for the online content;
generates a signal for reading by the content server to indicate a current broadcast status of the broadcast event together with the associated identifier for the online content, the current broadcast status being one of the predefined broadcast statuses;
update, as time proceeds, the generated signal for reading by the content server to reflect a change of the current broadcast status of the broadcast event from a first broadcast status to a second broadcast status;

wherein, upon the generated signal being read by the content server, the content server transmits the online content associated with the identifier indicated by the generated signal to the computing device in accordance with the broadcast status indicated by the generated signal.

22. The coordination server of claim 21, wherein the scheduling information comprises a scheduled begin time for when the broadcast event is to be broadcasted on broadcast television.

23. The coordination server of claim 22, wherein prior to the scheduled begin time, the generated signal indicates, as the current broadcast status, that the broadcast event is about to be broadcasted.

24. The coordination server of claim 23, wherein at the scheduled begin time, the generated signal is updated to indicate that the broadcast event is being broadcasted live.

25. The coordination server of claim 24, wherein the scheduling information comprises a scheduled end time for when the broadcast event is to cease being broadcasted on broadcast television, and at the scheduled end time, the generated signal is updated to cease indicating that the broadcast event is being broadcasted live.

26. The coordination server of claim 25, wherein for a predetermined period after the scheduled end time, the generated signal is updated to indicate that the broadcast event has recently been broadcasted.

27. The coordination server of claim 21, wherein the coordination index comprises additional scheduling information of additional broadcast events to be broadcasted on broadcast television, and wherein the scheduling information and the additional scheduling information comprises sequence information for an airing order of the broadcast event and the additional broadcast events, without including schedule begin times for the broadcast event and the additional broadcast events.

28. The coordination server of claim 27, wherein the coordination index comprises additional scheduling information of the additional broadcast events to be broadcasted on broadcast television, and the content server stores additional online content, the processor of the coordination server being further configured to:
  based on the coordination index, generate additional signals to indicate respective broadcast statuses of the additional broadcast events;
  wherein, upon the additional generated signals being read by the content server, the content server transmits the additional online content to the computing device in accordance with the one or more rules for interpreting the generated signal by the content server.

29. The coordination server of claim 28, wherein the additional scheduling information for one of the additional broadcast events indicates that one of the additional broadcast events is to be broadcasted on broadcast television during a time period immediately preceding the broadcast event, and during the time period, the generated signal for the broadcast event is updated to indicate that the broadcast event is to be broadcasted next.

30. The coordination server of claim 29, wherein the processor is further to:
  receive an input that indicates whether the broadcast event is being broadcasted live on broadcast television; and
  insert the information from the input into the generated signal.

31. The coordination server of claim 21, wherein one or more rules for interpreting the generated signal by the content server provide that when the current broadcast status indicated by the generated signal indicates the broadcast event is being broadcasted live, the content server is configured to transmit the online content to the computing device so that the online content can be displayed synchronously.

32. The coordination server of claim 31, wherein the one or more rules for interpreting the generated signal by the content server provide that when the current broadcast status indicated by the generated signal indicates that the broadcast event has recently been broadcasted, the content server is configured to transmit the online content to the computing device so that the online content can be outputted within an amount of time after the broadcast event was broadcasted live.

33. The coordination server of claim 32, wherein the one or more rules for interpreting the generated signal by the content server provide that when the broadcast status indicated by the generated signal indicates that the broadcast event is about to be broadcasted, the content server is configured to transmit the online content to the computing device so that the online content can be outputted within an amount of time before the broadcast event is broadcasted live.

34. The coordination server of claim 33, wherein the amount of time is selected from the group consisting of: 15 seconds, 30 seconds, 1 minute, 2 minutes, 5 minutes, 10 minutes, 15 minutes, 30 minutes, and 1 hour.

35. The coordination server of claim 34, wherein the generated signal comprises a timestamp for when the generated signal began to indicate that the broadcast event is being broadcasted live.

36. The coordination server of claim 35, wherein the broadcast event comprises a television advertisement.

37. The coordination server of claim 36, wherein the online content comprises an online advertisement to be displayed within a browser application executing on the computing device.

38. The coordination server of claim 37, wherein the content server comprises an online advertisement service server configured to read the generated signal as an input for triggering when the online advertisement is to be served for display within the browser application.

39. The coordination server of claim 38, wherein prior to the reading of the coordination index, the processor generates the coordination index by:
  loading campaign information comprising the identifier for the online content and a first campaign identifier associated with the online content;
  loading a roster file comprising the scheduling information of the broadcast event and a second campaign identifier associated with the broadcast event; and
  merging the roster file with the campaign information by associating the scheduling information of the broadcast event with the identifier for the online content when the first campaign identifier matches the second campaign identifier.

40. The coordination server of claim 39, wherein the associated identifier for the online content indicated by the generated signal is used by the online content server to identify the online content at the online content server prior to transmitting the online content to the computing device.

41. A non-transitory computer readable medium storing instructions for execution by a processor at a server to coordinate the display of online content with a broadcast event on broadcast television, the online content being stored on a content server, wherein when the instructions are executed by the processor, the processor:

reads a coordination index, the coordination index comprising:
an identifier for the online content, the online content transmittable to a computing device for output on the computing device, and
scheduling information of the broadcast event to be broadcasted on broadcast television, the scheduling information indicating a broadcast status of the broadcast event during at least one of a time period preceding the broadcast event being broadcasted, contemporaneous with the broadcast event being broadcasted and succeeding the broadcast event being broadcasted, wherein the broadcast status is one of a set of predefined broadcast statuses,
wherein the coordination index associates the scheduling information of the broadcast event to be broadcasted on broadcast television with the identifier for the online content;
generates a signal for reading by the server to indicate a current broadcast status of the broadcast event together with the associated identifier for the online content, the current broadcast status being one of the predefined broadcast statuses;
updating, as time proceeds, the generated signal for reading by the content server to reflect a change of the broadcast status of the broadcast event from a first broadcast status to a second broadcast status;
wherein, upon the generated signal being read by the server, the server transmits the online content associated with the identifier indicated by the generated signal to the computing device in accordance with the broadcast status indicated by the generated signal.

* * * * *